United States Patent
Beall et al.

(10) Patent No.: US 10,487,008 B2
(45) Date of Patent: Nov. 26, 2019

(54) COLORED AND OPAQUE GLASS CERAMIC(S), ASSOCIATED COLORABLE AND CERAMABLE GLASS(ES), AND ASSOCIATED PROCESS(ES)

(71) Applicant: CORNING INCORPORATED, Corning, NY (US)

(72) Inventors: George Halsey Beall, Big Flats, NY (US); Matthew John Dejneka, Corning, NY (US); Sinue Gomez, Corning, NY (US); Charlene Marie Smith, Corning, NY (US); Steven Alvin Tietje, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/702,010

(22) Filed: Sep. 12, 2017

(65) Prior Publication Data

US 2017/0369361 A1 Dec. 28, 2017

Related U.S. Application Data

(62) Division of application No. 14/801,278, filed on Jul. 16, 2015, now Pat. No. 9,790,125, which is a division of application No. 13/973,195, filed on Aug. 22, 2013, now Pat. No. 9,115,023.

(60) Provisional application No. 61/693,875, filed on Aug. 28, 2012.

(51) Int. Cl.
| | | |
|---|---|---|
| *C03C 10/12* | (2006.01) |
| *C03C 10/02* | (2006.01) |
| *C03B 32/02* | (2006.01) |
| *C03C 14/00* | (2006.01) |
| *C03C 3/085* | (2006.01) |
| *C03C 3/093* | (2006.01) |
| *C03C 3/097* | (2006.01) |
| *C03C 4/02* | (2006.01) |
| *C03C 10/00* | (2006.01) |
| *C03C 21/00* | (2006.01) |
| *C03B 20/00* | (2006.01) |

(52) U.S. Cl.
CPC .......... *C03C 14/006* (2013.01); *C03B 20/00* (2013.01); *C03B 32/02* (2013.01); *C03C 3/085* (2013.01); *C03C 3/093* (2013.01); *C03C 3/097* (2013.01); *C03C 4/02* (2013.01); *C03C 10/0027* (2013.01); *C03C 10/0045* (2013.01); *C03C 10/0054* (2013.01); *C03C 21/002* (2013.01); *C03C 2204/04* (2013.01)

(58) Field of Classification Search
CPC .......................... C03C 10/0027; C03B 32/02
See application file for complete search history.

(56) References Cited

U.S. PATENT DOCUMENTS

| | | | |
|---|---|---|---|
| 3,775,154 A | 11/1973 | Grego et al. | |
| 3,788,865 A | 1/1974 | Babcock et al. | |
| 4,140,645 A | 2/1979 | Beall et al. | |
| 4,192,665 A | 3/1980 | Chyung et al. | |
| 4,212,678 A | 7/1980 | Chyung et al. | |
| 5,176,961 A | 1/1993 | Crooker et al. | |
| 5,179,045 A | 1/1993 | Aitken et al. | |
| 5,446,008 A | 8/1995 | Krolla et al. | |
| 5,492,869 A * | 2/1996 | Beall ........................ | C03C 4/02 501/68 |
| 6,846,760 B2 | 1/2005 | Siebers et al. | |
| 7,465,686 B2 * | 12/2008 | Comte .................... | C03C 1/004 501/4 |
| 7,476,633 B2 | 1/2009 | Comte et al. | |
| 7,507,681 B2 | 3/2009 | Aitken et al. | |
| 8,048,816 B2 | 11/2011 | Beall et al. | |
| 8,127,571 B2 * | 3/2012 | Martin .................... | C03C 1/004 65/134.1 |
| 8,198,201 B2 | 6/2012 | Comte et al. | |

(Continued)

FOREIGN PATENT DOCUMENTS

| | | | |
|---|---|---|---|
| DE | 202010014361 U1 | 2/2011 | |
| JP | 60180936 A | 9/1985 | |

(Continued)

OTHER PUBLICATIONS

"Materials Science and Engineering (fourth edition)" by William D. Callister (John Wiley & Sons, York, 1997); pp. 130-134.

(Continued)

*Primary Examiner* — Karl E Group

(74) *Attorney, Agent, or Firm* — Kevin M. Johnson

(57) ABSTRACT

Disclosed herein are glass-ceramics having crystalline phases including β-spodumene ss and either (i) pseudo-brookite or (ii) vanadium or vanadium containing compounds so as to be colored and opaque glass-ceramics having coordinates, determined from total reflectance—specular included—measurements, in the CIELAB color space of the following ranges: L*=from about 20 to about 45; a*=from about −2 to about +2; and b*=from about −12 to about +1. Such CIELAB color space coordinates can be substantially uniform throughout the glass-ceramics. In each of the proceeding, β-quartz ss can be substantially absent from the crystalline phases. If present, β-quartz ss can be less than about 20 wt % or, alternatively, less than about 15 wt % of the crystalline phases. Also Further crystalline phases might include spinel ss (e.g., hercynite and/or gahnite-hercynite ss), rutile, magnesium zinc phosphate, or spinel ss (e.g., hercynite and/or gahnite-hercynite ss) and rutile.

13 Claims, 7 Drawing Sheets

(56) References Cited

U.S. PATENT DOCUMENTS

| | | | |
|---|---|---|---|
| 8,518,842 B2* | 8/2013 | Schreder | C03C 1/004 501/4 |
| 8,753,991 B2 | 6/2014 | Comte et al. | |
| 8,765,619 B2 | 7/2014 | Brunet et al. | |
| 9,115,023 B2* | 8/2015 | Beall | C03B 20/00 |
| 9,199,872 B2 | 12/2015 | Schoenberger et al. | |
| 9,790,125 B2* | 10/2017 | Beall | C03B 20/00 |
| 2005/0255983 A1 | 11/2005 | Becker et al. | |
| 2007/0004578 A1* | 1/2007 | Monique Comte | C03C 1/004 501/4 |
| 2007/0105700 A1 | 5/2007 | Horsfall et al. | |
| 2007/0213192 A1 | 9/2007 | Monique Comte et al. | |
| 2009/0274869 A1 | 11/2009 | Beall et al. | |
| 2010/0069219 A1* | 3/2010 | Martin | C03C 1/004 501/27 |
| 2010/0130342 A1 | 5/2010 | Siebers et al. | |
| 2010/0304948 A1 | 12/2010 | Comte et al. | |
| 2011/0092353 A1 | 4/2011 | Amin et al. | |
| 2011/0136651 A1* | 6/2011 | Yagi | C03C 3/097 501/7 |
| 2012/0035041 A1 | 2/2012 | Comte | |
| 2012/0085336 A1* | 4/2012 | Brunet | C03C 3/087 126/211 |
| 2012/0135848 A1 | 5/2012 | Beall et al. | |
| 2014/0066285 A1* | 3/2014 | Beall | C03B 20/00 501/32 |
| 2014/0087194 A1 | 3/2014 | Dejneka et al. | |
| 2015/0321947 A1* | 11/2015 | Beall | C03B 20/00 501/32 |

FOREIGN PATENT DOCUMENTS

| | | | | |
|---|---|---|---|---|
| JP | | 2008007398 A | 1/2008 | |
| WO | WO-2010136731 A2 * | | 12/2010 | C03C 3/087 |

OTHER PUBLICATIONS

"Standard Practice for Measuring Viscosity of Glass Above the Softening Point" ASTM Designation C965-96.
"Standard Test Method for Dynamic Young's Modulus, Shear Modulus, and Poisson's Ratio for Advanced Ceramics by Impulse Excitation of Vibration" ASTM Designation C1269-08.
"Standard Test Method for Knoop Indentation Hardness of Advanced Ceramics" ASTM Designation C1326-08.
Standard Test Method for Measurement of Viscosity of Glass Between 104 PA S and 108 PA S by Viscous Compression of a Solid Right Cylinder [Metric].
"Standard Test Method for Measurement of Viscosity of Glass Between Softening Point and Annealing Range (Approximately 108 PA•S to Approximately 1013 PA•S) by Beam Bending (Metric)" ASTM Designation C1350M-96.
"Standard Test Method for Monotonic Equibiaxial Flexural Strength of Advanced Ceramics at Ambient Temperature" ASTM Designation C1499-09.
"Standard Test Method for Vickers Indentation Hardness of Advanced Ceramics" ASTM Designation C1327-08.
Agilent Application Note: "Basics of Measuring the Dielectric Properties of Materials," Brochure No. 5989-2589EN, Agilent Technologies, Inc., Apr. 28, 2005.
Akio Makishima et al. "Glass material design support system: VitrES" FUJITSU, Japan, Fujitsu Corporation, 1993 33(6) pp. 560-565 ISSN: 0016-2515.
Baker-Jarvis et al. "Dielectric and Conductor-Loss Characterization and Measurements on Electronic Packaging Materials," Natl. Inst. Stand. Technol. Tech. Note 1520, 156 pages (Jul. 2001).
Baker-Jarvis et al. "Transmission/Reflection and Short-Circuit Line Methods for Measuring Permittivity and Permeability," Natl. Inst. Stand. Technol. Tech. Note 1355-R, 236 pages (Dec. 1993).
Baker-Jarvis et al., "Measuring the Permittivity and Permeability of Lossy Materials: Solids, Liquids, Metals, Building Materials, and Negative-index Materials", Natl. Inst. Stand. Technol. Tech. Note 1536, 2004.
Baker-Jarvis et al., "Analysis of an Open-Ended Coaxial Probe," IEEE Trans. Instrum. Meas., vol. 43. No. 5, pp. 711-718 (Oct. 1994).
Baker-Jarvis, et al., "High-Frequency Dielectric Measurements," IEEE Instrum. Meas. Mag., pp. 24-31, Apr. 2010.
Bussey, "Measurement of RF Properties of Materials. A Survey", Proc. IEEE, vol. 55, pp. 1046-1053, 1967.
Crank; "The Mathematics of Diffusion," 2nd ed., 1975.
English Translation of CN201380056210.6 Notice of First Office Action dated Sep. 6, 2016; 10 Pages; Chinese Patent Office.
English Translation of CN201380056210.6 Notice of Second Office Action dated Apr. 21, 2017; Chinese Patent Office.
http://www.labsphere.com/uploads/LambdaSpectroscopyBrochure.pdf "High Performance LAMBDA Spectroscopy Accessories".
http://www.luceo.co.jp/catalog/catalog-pdf/FSM-7000H_cat.pdf.
http://www.luceo.co.jp/english/pdf/FSM-6000LE%20Ecat.pdf.
http://www.luceo.co.jp/english/pdf/FSM-60LE%20Ecat.pdf.
http://www.orihara-ss.co.jp/catalog/fsm/fsm-30-Ecat.pdf.
http://www.perkinelmer.com.cn/CMSResources/Images/46-131732BRO_Lambda950850650Americas.pdf.
http://www.perkinelmer.com/CMSResources/Images/44-74191APP_LAMBDA650IntegratingSpheres.pdf.
https://www.thermo.com/eThermo/CMA/PDFs/Product/productPDF_24179.pdf "Thermo Scientific Grams Suite-A Solution for Visualizing, Processing and Managaing Spectroscopy Data".
International Search Report of the International Searching Authority; PCT/US2013/056172; dated Feb. 28, 2014; 5 Pages.
JP2015529871 Office Action dated Aug. 8, 2017, Japan Patent Office.
Kishii, "Surface Stress Meters Utilising the Optical Waveguide Effect of Chemically Tempered Glasses," Optics & Lasers in Engineering 4 (1983) pp. 25-38.
Kobayashi et al., "Chemical Strengthening of Glass and Industrial Application," [52 (1977)], pp. 109-112.
Sglavo et al., "Procedure for Residual Stress Profile Determination by Curvature Measurements," Mechanics of Materials, 37 (2005) pp. 887-898.
TW102130615 Search Report dated Nov. 1, 2016, Taiwan Patent Office.
English Translation of JP2015529871 Office Action dated Jul. 3, 2018, Japan Patent Office, 4 Pgs.

* cited by examiner

COLORED AND OPAQUE GLASS CERAMIC(S), ASSOCIATED COLORABLE AND CERAMABLE GLASS(ES), AND ASSOCIATED PROCESS(ES)

CROSS-REFERENCE TO RELATED APPLICATIONS

This application is a divisional of U.S. application Ser. No. 14/801,278 filed on Jul. 16, 2015, now U.S. Pat. No. 9,790,125, which is a divisional of U.S. patent application Ser. No. 13/973,195 filed on Aug. 22, 2013, now U.S. Pat. No. 9,115,023, which claims the benefit of priority of U.S. Provisional Application Ser. No. 61/693,875 filed on Aug. 28, 2012, the content of which is relied upon and incorporated herein by reference in its entirety, and the benefit of priority under 35 U.S.C. § 120 is hereby claimed.

TECHNICAL FIELD

Aspects of embodiments and/or embodiments of this disclosure generally relate to the field of glass materials technology and more specifically to the field of opaque glass-ceramic materials technology. Also, aspects of embodiments and/or embodiments of this disclosure are directed to one or more of a glass composition ceramable (herein after "colorable and ceramable glass" or "colorable and ceramable glasses"),to a black colored or gray colored and opaque glass-ceramics comprising β-spodumene solid solution (β-spodumene ss) and either (i) pseudobrookite or (ii) vanadium or vanadium containing compounds (herein after "colored and opaque glass-ceramic" or "colored and opaque glass-ceramics"), a colored and opaque glass-ceramic, a colored and opaque glass-ceramic subjectable to an ion exchange surface treatment, an ion exchanged colored and opaque glass-ceramic, a machine or equipment including a colored and opaque glass-ceramic, a machine or equipment including an ion exchanged colored and opaque glass-ceramic, a process for making colorable and ceramable glasses ceramable to colored and opaque glass-ceramics, a process for making a colored and opaque glass-ceramics, a process for making an ion exchanged colored and opaque glass-ceramic, and one or more processes for using any one of a ceramable and colored glasses, colored and opaque glass-ceramics, and ion exchanged colored and opaque glass-ceramics.

BACKGROUND

In the past decade, as electronic devices such as notebook computers, personal digital assistants (PDAs), portable navigation device (PNDs), media players, mobile phones, portable inventory devices (PIDs) . . . etc. (frequently referred to as "portable computing devices") have converged while at the same time becoming small, light, and functionally more powerful. One factor contributing to the development and availability of such smaller devices is an ability to increase computational density and operating speed by ever decreasing electronic component sizes. However, the trend to smaller, lighter, and functionally more powerful electronic devices presents a continuing challenge regarding design of some components of the portable computing devices.

Components associated with the portable computing devices encountering particular design challenges include the enclosure or housing used to house the various internal/electronic components. This design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosure or housings, typically thicker plastic structures with more fasteners having more weight. Unfortunately, the increased weight of the stronger, more rigid plastic structures might lead to user dissatisfaction, while the bowing and buckling of the lighter structures might damage the internal/electronic components of the portable computing devices and almost certainly leading to user dissatisfaction.

Among known classes of materials are glass-ceramics that are used widely in various other applications. For example, glass-ceramics are used widely in kitchens as cooktops, cookware, and eating utensils, such as bowls, dinner plates, and the like. Transparent glass-ceramics are used in the production of oven and/or furnace windows, optical elements, mirror substrates, and the like. Glass-ceramics are typically made by ceramming precursor glass compositions at specified temperatures for specified periods of time to nucleate and grow crystalline phases in a glass matrix. Two glass-ceramics based on the $SiO_2$—$Al_2O_3$—$Li_2O$ glass system comprise those having either β-quartz solid solution ((β-quartz ss) as the predominant crystalline phase or β-spodumene solid solution ((β-spodumene ss) as the predominant crystalline phase. There exists a need for colorable and ceramable glasses and/or colored and opaque glass-ceramics and/or ion exchangeable colored and opaque glass-ceramics and/or ion exchanged colored and opaque glass-ceramic that provide improved black or grey colors for enclosures or housings of portable computing devices. Also, there exists a need for such materials that provide such improved colors while addressing the design challenge of creating light, strong, and rigid enclosures or housings.

SUMMARY

Some aspects of embodiments and/or embodiments of this disclosure relate to glass-ceramics having crystalline phases including β-spodumene ss and either (i) pseudobrookite or (ii) vanadium or vanadium containing compounds so as to be colored and opaque glass-ceramics having coordinates, determined from total reflectance—specular included—measurements, in the CIELAB color space of the following ranges: $L^*$=from about 20 to about 45; $a^*$=from about −2 to about +2; and $b^*$=from about −12 to about +1. Advantageously, such coordinates in the CIELAB color space can be substantially uniform throughout the colored and opaque glass-ceramics. In one aspect, the additional component comprises crystalline phases including pseudobrookite. In another aspect, the additional component comprises vanadium or vanadium containing compounds and, optionally, any one of tin or tin containing compounds, sulfur or sulfur containing compounds, and any two or more of the preceding. In each of the proceeding aspects, β-quartz ss can be substantially absent from the crystalline phases while, if present, β-quartz ss can be less than about 20 percent by weight (wt %) and, alternatively, less than about 15 wt % of the crystalline phases. Also in each of the proceeding aspects, further crystalline phases might include spinel ss (e.g., hercynite and/or gahnite-hercynite ss), rutile, magnesium zinc phosphate, or spinel ss (e.g., hercynite and/or gahnite-hercynite ss) and rutile.

Other aspects of embodiments and/or embodiments of this disclosure relate to ion exchangeable, colored and opaque glass-ceramics or ion exchanged colored and opaque glass-ceramics of the previous paragraph. In an aspect, ion exchangeable colored and opaque glass-ceramics are capable of being treated to have a layer under an average surface compression (CS) of at least about 200 megapascals (MPa). Such compressively stressed layer can extend a distance from a surface of the glass-ceramic into the glass-ceramic to a depth (a.k.a depth of layer and DOL) of at least about 20 microns (μm) and, alternatively, such compressively stressed layer has a DOL of at least about 60 μm. It follows that in another aspect, ion exchanged, colored and opaque glass-ceramics can have been treated to have to an average surface compression (CS) of at least about 200 MPa in a compressively stressed layer having a DOL of at least about 20 μm and, alternatively, a DOL of at least about 60 μm. In aspects relating to about 0.8 millimeter (mm) thick ion exchanged, colored and opaque glass-ceramics, compressively stressed layers can have a DOL of at least about 20 μm up to about 150 μm; alternatively, a DOL of at least about 40 μm up to about 150 μm; and, then again, a DOL of at least about 80 μm up to about 120 μm.

Yet other aspects of embodiments and/or embodiments of this disclosure relate to colorable and ceramable glasses suitable for ceramming to a black colored or gray colored and opaque glass-ceramic. Compositions of such glasses, in wt % on an oxide basis comprise from about 95 to about 99.7 of a base composition and the balance one or more colorants. In various aspects, the one or more colorants can be one or more iron based materials; or one or more iron based materials and one or more additional transition metal based materials; or one or more multivalent metal based materials. In each of the proceeding aspects, colorable and ceramable glasses comprise, calculated compositions in wt % on an oxide basis the following: $SiO_2$: about 53.5 to about 70; $Al_2O_3$: about 16.9 to about 24.5; $B_2O_3$: about 0 to about 2; $Li_2O$: about 3.3 to about 4.5; $Na_2O$: about 0.3 to about 0.5; $TiO_2$: about 2.5 to about 6.2; MgO: about 1.5 to about 3; ZnO: about 0 to about 2.2; $P_2O5$: about 0 to about 7.7; $SnO_2$: about 0 to about 1; $Fe_2O_3$: about 0 to about 5; one or more oxides of one or more additional transition metals: about 0 to about 4; and one or more oxides of one or more multivalent metals: about 0 to about 4. It will be appreciated that such colorable and ceramable glasses, upon ceramming at preselected temperatures for corresponding preselected times to nucleate and grow crystalline phases, can give rise to the opaque glass-ceramics and/or ion exchangeable and opaque glass-ceramics described in the previous paragraphs. Also, it will be appreciated that such colorable and ceramable glasses, upon treatment using one or more preselected ion exchange techniques at corresponding preselected temperatures for corresponding preselected times, can give rise to ion exchanged opaque glass-ceramics described in the previous paragraphs.

Yet additional aspects of embodiments and/or embodiments of this disclosure relate to methods of making any one of any one of ceramable and colored glasses, colored and opaque glass-ceramics, ion exchangeable colored and opaque glass-ceramics, and ion exchanged colored and opaque glass-ceramics. To that end, some aspects relate to methods of making ceramable and colored glasses by melting raw materials of preselected compositions including preselected color packages mixed in corresponding preselected amounts so as to yield ceramable and colored glasses suitable for ceramming to black colored or gray colored and opaque glass-ceramics. It will be appreciated that components of raw materials or ingredients for specified color packages used to provide the one or more colorants to colored and opaque glass-ceramics and/or ceramable and colored glasses might and can included preselected compositions mixed in corresponding preselected amounts that differ in their amount and/or chemical character (e.g., compound versus element and/or vice versa, carbonate versus oxide, mixed oxide versus oxide and/or vice versa, valance state . . . etc.) and/or physical character (e.g., crystalline versus. amorphous and/or vice versa, single phase versus multiphase and/or vice versa, precipitate versus in solution and/or vice versa, present versus fugitive . . . etc.) from the one or more colorants.

In the above aspects relating to color packages, this disclosure contemplates using raw materials or ingredients of preselected compositions mixed in a corresponding preselected amounts that are capable of yielding one or more colorants levels, calculated in wt % on an oxide basis, comprising any one of:

$Fe_2O_3$: about 0.3 to about 5;
$Fe_2O_3$: about 0.3 to about 5 and one or more oxides of one or more additional transition metals: about 0 to about 4; or
one or more oxides of one or more multivalent metals: about 0 to about 4.

Still other aspects relate to methods of making colored and opaque glass-ceramics comprising β-spodumene solid solution (β-spodumene ss) and either (i) pseudobrookite or (ii) vanadium or vanadium containing compounds by:

subjecting the colorable and ceramable glass to a nucleating heat treatment by heating at a preselected first rate to a preselected nucleating temperature (TEMPn), and holding at the preselected nucleating temperature (TEMPn) for a preselected first time; and:

subjecting the heat treated glass to a ceramming heat treatment by heating at a preselected second rate to a preselected ceramming temperature (TEMPc), holding at the preselected ceramming temperature (TEMPc), for a preselected second time; and cooling at a preselected third rate to a preselected end temperature (TEMPe).

Such preselected nucleating temperature (TEMPn) can comprise about 700° C. to about 850° C. while the corresponding preselected first time can comprise about ¼ hour to about 4 hours. Also such preselected ceramming temperature (TEMPc) can comprise about 850° C. to about 1150° C. and the corresponding preselected second time can comprise about ¼ hour to about 16 hours. In each of the preceding, such preselected first rate and second rate can be the same or different and comprise from about 1° C./minute (min) to about 10° C./min.

In addition to exhibiting aesthetically suitable black or gray colors, applicants believe that the resultant colored and opaque glass-ceramics and/or ion exchanged, colored and opaque glass-ceramics can possess advantageous properties such as, for example:

a loss tangent over a frequency ranging from about 0.5 to about 3.0 gigahertz (GHz) at about 25° C. of less than about 0.05; alternatively, less than about 0.03; then again, less than about 0.02;

a dielectric constant over a frequency ranging from about 0.5 to about 3.0 gigahertz (GHz) at about 25° C. of less than about 8; alternatively, less than about 7; or then again, less than about 6;

a fracture toughness of greater than 0.3 MPa·m½; alternatively, greater than 0.5 MPa·m½; or then again, greater than about 1 MPa·m½; and a modulus of rupture (MOR) of greater than about 135 MPa; alternatively, greater than 275 MPa; or then again, greater than about 340 MPa;

Knoop hardness of at least about 400 kg/mm$^2$; alternatively, at least about 550 kg/mm$^2$; or then again, at least about 700 kg/mm$^2$; or combinations and two or more of the preceding.

To that end, the colored and opaque glass-ceramics and/or ion exchanged, colored and opaque glass-ceramics can be used in a variety of electronic devices or portable computing devices, which can configured for wireless communication, such as, computers and computer accessories, such as, "mice", keyboards, monitors, game controllers, tablets, whiteboards . . . etc.; personal digital assistants (PDAs); portable navigation device (PNDs); portable inventory devices (PIDs); entertainment centers and center accessories such as, tuners, media players (e.g., record, cassette, disc . . . etc.), cable and/or satellite receivers, keyboards, monitors, game controllers . . . etc.; electronic reader devices or e-reader; mobile and/or smart phones . . . etc.

Numerous other aspects of embodiments, embodiments, features, and advantages of this disclosure will appear from the following description and the accompanying drawings. In the description and/or the accompanying drawings, reference is made to exemplary aspects of embodiments and/or embodiments of this disclosure which can be applied individually or combined in any way with each other. Such aspects of embodiments and/or embodiments do not represent the full scope of this disclosure. Reference should therefore be made to the claims herein for interpreting the full scope of this disclosure. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings, and the appended claims.

BRIEF DESCRIPTION OF THE FIGURES

The drawings referenced herein form a part of the specification. Features shown in the drawings are meant to be illustrative of some, but not all, embodiments of this disclosure, unless otherwise explicitly indicated, and implications to the contrary are otherwise not to be made. Although like reference numerals correspond to similar, though not necessarily identical, components and/or features in the drawings, for the sake of brevity, reference numerals or features having a previously described function may not necessarily be described in connection with other drawings in which such components and/or features appear.

DETAILED DESCRIPTION

Figure 1:
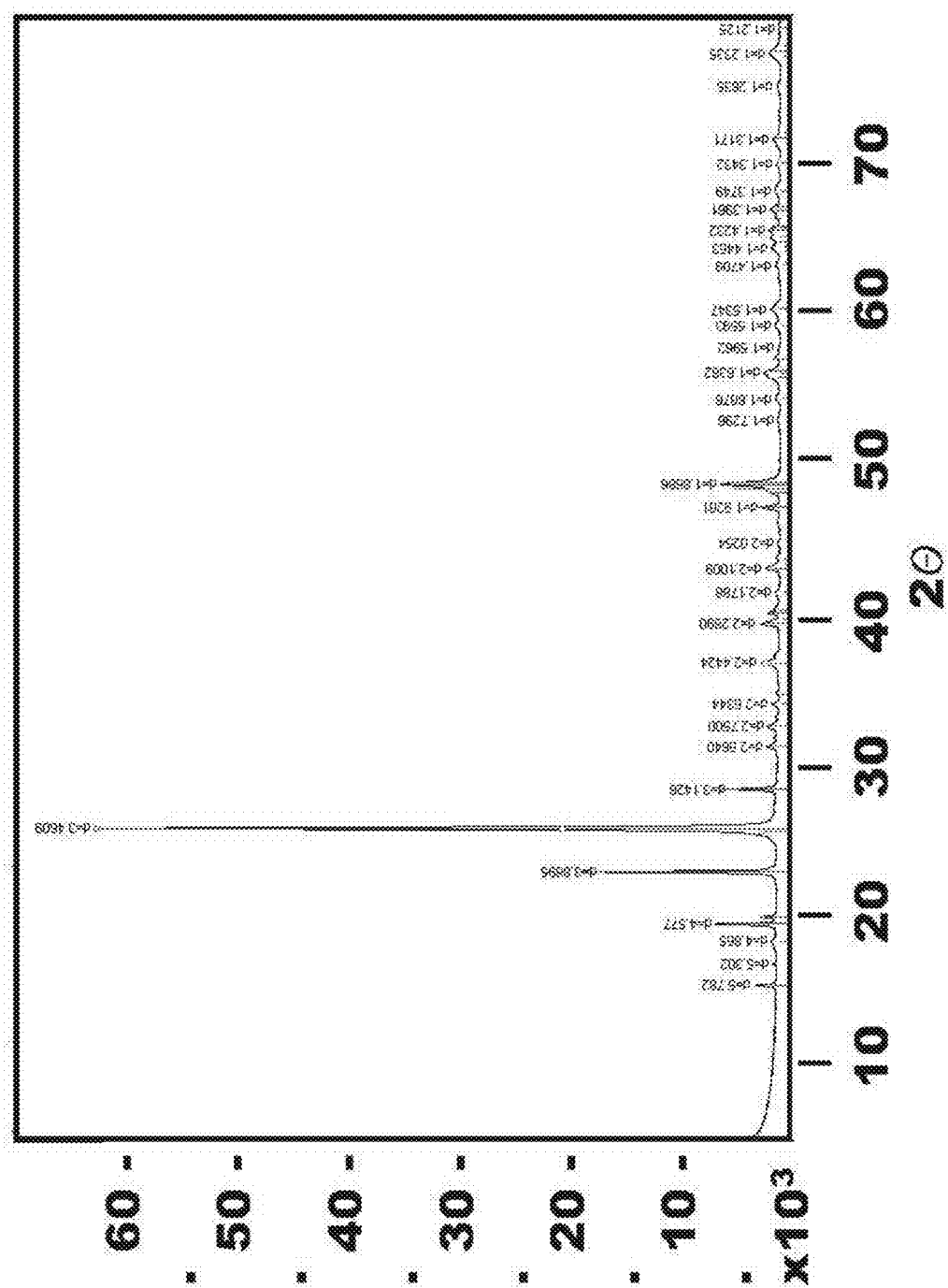
FIG. 1 shows the x-ray (XRD) diffraction pattern obtained for a colored and opaque glass-ceramic (Example 3 listed in Tables 1A and 1B made using a heat treatment of 780° C. 2h and 950° C.-4 h, heated at a ramp rate of 5° C./min) made according to aspects of embodiments and/or embodiments of this disclosure.

In the following description of exemplary aspects of embodiments and/or embodiments of this disclosure, reference is made to the accompanying drawings that form a part hereof, and in which are shown by way of illustration specific aspects of embodiments and/or embodiments in which this disclosure may be practiced. While these aspects of embodiments and/or embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects of embodiments and/or embodiments may be utilized, logical changes (e.g., without limitation, any one or more of chemical, compositional {e.g., without limitation, any one or more of chemicals, materials, . . . and the like}, electrical, electrochemical, electromechanical, electro-optical, mechanical, optical, physical, physiochemical, . . . and the like) and other changes may be made without departing from the spirit or scope of this disclosure. Accordingly, the following description is not to be taken in a limiting sense, and the scope of aspects of embodiments and/or embodiments of this disclosure are defined by the appended claims. It is also understood that terms such as "top," "bottom," "outward," "inward," . . . and the like are words of convenience and are not to be construed as limiting terms.

Some aspects of embodiments and/or embodiments of this disclosure relate to glass-ceramics having crystalline phases including β-spodumene ss and either (i) pseudobrookite or (ii) vanadium or vanadium containing compounds so as to be colored and opaque glass-ceramics having coordinates, determined from total—specular included—measurements, in the CIELAB color space of the following ranges: L*=from about 20 to about 45; a*=from about −2 to about +2; and b*=from about −12 to about +1. Advantageously, such coordinates in the CIELAB color space can be substantially uniform throughout the colored and opaque glass-ceramics. In one aspect, the additional component comprises crystalline phases including pseudobrookite. In another aspect, the additional component comprises vanadium or vanadium containing compounds and, optionally, any one of tin or tin containing compounds, sulfur or sulfur containing compounds, and any two or more of the preceding. In each of the proceeding aspects, β-quartz ss can be substantially absent from the crystalline phases while, if present, β-quartz ss can be less than about 20 percent by weight (wt %) and, optionally, less than about 15 wt % of the crystalline phases. Also in each of the proceeding aspects, further crystalline phases might include spinel ss (e.g., hercynite and/or gahnite-hercynite ss), rutile, magnesium zinc phosphate, or spinel ss (e.g., hercynite and/or gahnite-hercynite ss) and rutile.

Yet other aspects of embodiments and/or embodiments of this disclosure relate to ion exchangeable, colored and opaque glass-ceramics or ion exchanged colored and opaque glass-ceramics of the previous paragraph. In an aspect, ion exchangeable colored and opaque glass-ceramics are capable of being treated to have a layer under an average surface compression (CS) of at least about 200 megapascals (MPa). Such compressively stressed layer can extend a distance from a surface of the glass-ceramic into the glass-ceramic to a depth (a.k.a depth of layer and DOL) of at least about 20 microns (μm) and, optionally, such compressively stressed layer has a DOL of at least about 60 μm. It follows that in another aspect, ion exchanged, colored and opaque glass-ceramics can have been treated to have to an average surface compression (CS) of at least about 200 MPa in a compressively stressed layer having a DOL of at least about 20 μm and, optionally, a DOL of at least about 60 μm. In aspects relating to about 0.8 millimeter (mm) thick ion exchanged, colored and opaque glass-ceramics, compressively stressed layers can have a DOL of at least about 20 μm up to about 150 μm; alternatively, a DOL of at least about 40 μm up to about 150 μm; and, then again, a DOL of at least about 80 μm up to about 120 μm.

Still yet other aspects of embodiments and/or embodiments of this disclosure relate to colorable and ceramable glasses suitable for ceramming to a black colored or gray colored and opaque glass-ceramic. Compositions of such glasses, in wt % on an oxide basis comprise from about 95 to about 99.7 of a base composition and the balance one or more colorants. In various aspects, the one or more colorants can be one or more iron based materials; or one or more iron based materials and one or more additional transition metal based materials; or one or more multivalent metal based materials. In each of the proceeding aspects, colorable and ceramable glasses comprise, calculated compositions in wt % on an oxide basis the following: $SiO_2$: about 53.5 to about 70; $Al_2O_3$: about 16.9 to about 24.5; $B_2O_3$: about 0 to about 2; $Li_2O$: about 3.3 to about 4.5; $Na_2O$: about 0.3 to about 0.5; $TiO_2$: about 2.5 to about 6.2; MgO: about 1.5 to about 3; ZnO: about 0 to about 2.2; $P_2O5$: about 0 to about 7.7; $SnO_2$: about 0 to about 1; $Fe_2O_3$: about 0 to about 5; one or more oxides of one or more additional transition metals: about 0 to about 4; and one or more oxides of one or more multivalent metals: about 0 to about 4. It will be appreciated that such colorable and ceramable glasses, upon ceramming at preselected temperatures for corresponding preselected times to nucleate and grow crystalline phases, can give rise to the opaque glass-ceramics and/or ion exchangeable and opaque glass-ceramics described in the previous paragraphs. Also, it will be appreciated that such colorable and ceramable glasses, upon treatment using one or more preselected ion exchange techniques at corresponding preselected temperatures for corresponding preselected times, can give rise to ion exchanged opaque glass-ceramics described in the previous paragraphs.

In some aspects relating to one or more colorants, compositions of the colorable and ceramable glasses can have $Fe_2O_3$: about 0.3 to about 5 while being substantial free of (e.g., substantially about 0) one or more oxides of one or more additional transition metals and one or more oxides of one or more multivalent metals. In these aspects, ceramming at preselected temperatures for corresponding preselected times, can give rise to the opaque glass-ceramics and/or ion exchangeable and opaque glass-ceramics having color coordinates in the CIELAB color space of the following ranges: L*=from about 20 to about 45; a*=from about −1.2 to about +0.5; and b*=from about −6 to about +1.

In other aspects relating to one or more colorants, compositions of the colorable and ceramable glasses can have $Fe_2O_3$: about 0.3 to about 2.5 and one or more oxides of one or more additional transition metals: up to about 3.5 while being substantial free of (e.g., substantially about 0) one or more oxides of one or more multivalent metals. In further aspects, the one or more additional transition metals can be Co, Ni, Mn, Cr, Cu, or combinations thereof In these other aspects, ceramming at preselected temperatures for corresponding preselected times, can give rise to the opaque glass-ceramics and/or ion exchangeable and opaque glass-ceramics having color coordinates in the CIELAB color space of the following ranges: L*=from about 25 to about 40; a*=from about −1.5 to about +1; and b*=from about −3.5 to about −2.

In yet other aspects relating to one or more colorants, compositions of the colorable and ceramable glasses can have $Fe_2O_3$: up to about 0.3 and one or more oxides of one or more multivalent metals: up to about 3 while being substantial free of (e.g., substantially about 0) one or more oxides of one or more additional transition metals. In further aspects, the one or more multivalent metals comprise Bi, V, Sn, Ti, or combinations thereof. Also, in still further aspects, vestiges of one or more elements from the one or more compounds including one of more components capable of reducing a valence or valences of at least a portion the one or more multivalent metals might be present. In some of these further aspects, vestiges might be in an amount of up to about 2 wt %. As can be the case when compounds of the one or more valence reducing compounds comprise C, S, or combinations thereof, it will be appreciated that some or all of the one or more elements can be fugitive. In these yet other aspects, ceramming at preselected temperatures for corresponding preselected times, can give rise to the opaque glass-ceramics and/or ion exchangeable and opaque glass-ceramics having color coordinates in the CIELAB color space of the following ranges: L*=from about 26 to about 33; a*=from about 0.1 to about 1; and b*=from about −1 to about −6.4.

Yet additional aspects of embodiments and/or embodiments of this disclosure relate to methods of making any one of any one of ceramable and colored glasses, colored and opaque glass-ceramics, ion exchangeable colored and opaque glass-ceramics, and ion exchanged colored and opaque glass-ceramics. To that end, some aspects relate to methods of making ceramable and colored glasses by melting raw materials of preselected compositions including preselected color packages mixed in corresponding preselected amounts so as to yield ceramable and colored glasses suitable for ceramming to black colored or gray colored and opaque glass-ceramics. It will be appreciated that components of raw materials or ingredients for specified color packages used to provide the one or more colorants to colored and opaque glass-ceramics and/or ceramable and colored glasses might and can included preselected compositions mixed in corresponding preselected amounts that differ in their amount and/or chemical character (e.g., compound versus element and/or vice versa, carbonate versus oxide, mixed oxide versus oxide and/or vice versa, valance state . . . etc.) and/or physical character (e.g., crystalline versus. amorphous and/or vice versa, single phase versus multiphase and/or vice versa, precipitate versus in solution and/or vice versa, present versus fugitive . . . etc.) from the one or more colorants. To that end, some aspects relate to methods of making color packages by providing and/or melting raw materials or ingredients of preselected compositions mixed in corresponding preselected amounts so as to yield preselected color packages.

Other aspects relate to methods of making colorable and ceramable glasses by melting raw materials capable of yielding ceramable and colored glasses suitable for ceramming to black colored or gray colored and opaque glass-ceramics comprising one or more colorants. In these other aspects, raw materials can include a first group of raw materials of preselected compositions mixed in a corresponding first group of preselected amounts so as to be capable of yielding at least ceramable base glasses or base glasses and either specified color packages of corresponding specified amounts or a second group raw materials or ingredients of preselected compositions mixed in a corresponding second group of preselected amounts that are capable of yielding specified color packages specified color packages of corresponding specified amounts.

In each of the proceeding aspects, the melting yields colorable and ceramable glasses, calculated compositions in wt % on an oxide basis, comprising about 95 to about 99.7 of base glasses and the balance one or more colorants. Also in each of the proceeding aspects, colorable and ceramable glasses, calculated compositions in wt % on an oxide basis, comprise the following: $SiO_2$: about 53.5 to about 70; $Al_2O_3$: about 16.9 to about 24.5; $B_2O_3$: about 0 to about 2; $Li_2O$: about 3.3 to about 4.5; $Na_2O$: about 0.3 to about 0.5; $TiO_2$: about 2.5 to about 6.2; MgO: about 1.5 to about 3; ZnO: about 0 to about 2.2; $P_2O5$: about 0 to about 7.7; $SnO_2$: about 0 to about 1; $Fe_2O_3$: about 0 to about 5; one or more oxides of one or more additional transition metals: about 0 to about 4; and one or more oxides of one or more multivalent metals: about 0 to about 4.

In the above aspects relating to color packages, this disclosure contemplates using raw materials or ingredients of preselected compositions mixed in a corresponding preselected amounts that are capable of yielding one or more colorants levels, calculated in wt % on an oxide basis, comprising any one of:
  $Fe_2O_3$: about 0.3 to about 5;
  $Fe_2O_3$: about 0.3 to about 5 and one or more oxides of one or more additional transition metals: about 0 to about 4; and
  one or more oxides of one or more multivalent metals: about 0 to about 4.

In aspects relating raw materials or ingredients yielding one or more colorants represented in wt % on an oxide basis as $Fe_2O_3$, preselected raw materials or ingredients comprise one or more iron compounds comprising one or more $Fe^{2+}$ sources, one or more $Fe^{3+}$ sources, or one or more $Fe^{2+}$ sources and one or more $Fe^{3+}$ sources. Examples of such one or more iron compounds include, without limitation, oxides (e.g., FeO, $Fe_2O_3$, $Fe_3O_4$, $Fe^{2+}Al_2O_4$, $(Fe^{3+},Mn^{3+})_2O_4$ . . . and the like), hydroxides (e.g., $Fe(OH)_2$, $Fe(OH)_3$, FeOOH, $FeOOH.0.4H_2O$ . . . and the like), carbonates (e.g., $FeCO_3$, $FeC_2O_4$ . . . and the like), sulfates (e.g., $FeSO_4$, $FeSO_4.H_2O$, $FeSO_4.4H_2O$, $FeSO_4.5H_2O$ . . . and the like), sulfides (e.g., Fe1−xS, FeS, Fe1+xS, $Fe_3S_4$, $CuFeS_2$ . . . and the like), . . . and the like or combinations thereof. In aspects, such preselected raw materials or ingredients comprising one or more iron compounds are provided in an amount so as to comprise $Fe_2O_3$ calculated in wt % on an oxide basis: about 0.1 to about 3.5.

In aspects relating raw materials or ingredients yielding one or more colorants represented in wt % on an oxide basis as $Fe_2O_3$ and one or more oxides of one or more additional transition metals, preselected raw materials or ingredients that yield on an oxide basis as $Fe_2O_3$ can be one or more iron compounds as discussed above while preselected raw materials or ingredients that yield on an oxide basis as one or more oxides of one or more additional transition metals can be sources for one or more additional transition metals, such as for example, one or more compounds comprising Co, Ni, Mn, Cr, Cu, or combinations thereof. As with iron compounds, these one or more compounds comprising Co, Ni, Mn, Cr, Cu, or combinations thereof can include, without limitation, oxides, hydroxides, carbonates, sulfates, sulfides, . . . and the like or combinations thereof. In aspects, such preselected raw materials or ingredients comprising one or more compounds comprising Co, Ni, Mn, Cr, Cu, or combinations thereof are provided in an amount so as to comprise any one of:
  $Co_3O_4$ calculated in wt % on an oxide basis: up to about 0.7;
  $Cr_2O_3$ calculated in wt % on an oxide basis: up to about 0.3;
  $MnO_2$ calculated in wt % on an oxide basis: up to about 2.4;
  CuO calculated in wt % on an oxide basis: up to about 0.5;
  NiO calculated in wt % on an oxide basis: up to about 0.6; and
  combinations thereof.

In aspects relating raw materials or ingredients yielding one or more colorants represented in wt % on an oxide basis one or more oxides of one or more multivalent metals, preselected raw materials or ingredients that yield on an oxide basis as one or more oxides of one or more multivalent metals can be sources for one or more one or more multivalent metals, such as for example, one or more compounds comprising Bi, V, Sn, Ti, or combinations thereof. As with iron compounds, these one or more compounds comprising Bi, V, Sn, Ti, or combinations thereof can include, without limitation, oxides, hydroxides, carbonates, sulfates, sulfides, . . . and the like or combinations thereof Included with the raw materials or ingredients yielding one or more colorants represented in wt % on an oxide basis one or more oxides of one or more multivalent metals are one or more compounds including one of more components capable of reducing a valence or valences of at least a portion the one or more multivalent metals such as any one of a carbon containing compound, a sulfur containing compound, or a carbon containing compound and a sulfur containing compound. In aspects, such preselected raw materials or ingredients comprising one or more compounds comprising Bi, V, Sn, Ti, or combinations thereof are provided in an amount so as to comprise in wt % on an oxide basis: about 0.1 to about 3 while carbon containing compounds and/or sulfur containing compounds are provided in an amount so as to comprise:

S in wt %: about 0 to about 1; or

C in wt %; wherein the sum of S wt % and C wt % comprises about 0.9 to about 2.

Still other aspects relate to methods of making colored and opaque glass-ceramics comprising β-spodumene solid solution (β-spodumene ss) and either (i) pseudobrookite or (ii) vanadium or vanadium containing compounds by:

subjecting the colorable and ceramable glass to a nucleating heat treatment by heating at a preselected first rate to a preselected nucleating temperature (TEMPn), and holding at the preselected nucleating temperature (TEMPn) for a preselected first time; and:

subjecting the heat treated glass to a ceramming heat treatment by heating at a preselected second rate to a preselected ceramming temperature (TEMPc), holding at the preselected ceramming temperature (TEMPc), for a preselected second time; and cooling at a preselected third rate to a preselected end temperature (TEMPe).

Such preselected nucleating temperature (TEMPn) can comprise about 700° C. to about 850° C. while the corresponding preselected first time can comprise about ¼ hour to about 4 hours. Also such preselected ceramming temperature (TEMPc) can comprise about 850° C. to about 1150° C. and the corresponding preselected second time can comprise about ¼ hour to about 16 hours. In each of the preceding, such preselected first rate and second rate can be the same or different and comprise from about 1° C./minute (min) to about 10° C./min.

In each of the preceding aspects of embodiments and/or embodiments of this disclosure on or more of the following applies:

An appropriate types and amount of one or more nucleation agents is included in the colorable and ceramable glass composition facilitates nucleation and/or growth of one or more ceramic phases during the nucleating and/or ceramming heat treatments. Among appropriate types of one or more nucleation agents are $TiO_2$, $ZrO_2$ . . . etc. while among appropriate amounts by weight (wt %) are $TiO_2$: from about 1 to about 4 or more; or $ZrO_2$: from about 0.8 to about 2.5 or more; or $TiO_2+ZrO_2$: from about 0.8 to about 4.5 or more . . . etc;

An appropriate amount $Li_2O$ in the colorable and ceramable glass composition is conducive to the formation of β-spodumene ss crystalline phase. Among appropriate amounts is by weight (wt %) $Li_2O$: from about 3.3 to about 4.5 or more;

The β-spodumene ss crystalline phase desirably exhibits a $Li_2O:Al_2O_3:nSiO_2$ molar ratio of 1:1:5-1:1:8. Maintaining such a molar ratio is desirable so as to avoid the formation of excessive levels of the unstable residual phases which might occurs below a 1:1:5 molar ratio and to avoid possible meltability issues when the molar ratio exceeds 1:1:8;

When the one or more colorants includes one or more iron compounds and the one or more additional transition metals includes Mn, the $Fe_2O_3$ to $MnO_2$ by weight (wt %) is desirably maintained from about 0.6 to about 1 in the colorable and ceramable glass composition so as to obtain an opaque material upon a formation a glass-ceramic; or combinations and two of more of the preceding.

In addition to exhibiting aesthetically suitable black or gray colors, the resultant colored and opaque glass-ceramics and/or ion exchanged, colored and opaque glass-ceramics can possess advantageous properties such as, for example:

a loss tangent over a frequency ranging from about 0.5 to about 3.0 gigahertz (GHz) at about 25° C. of less than about 0.05; alternatively, less than about 0.03; then again, less than about 0.02;

a dielectric constant over a frequency ranging from about 0.5 to about 3.0 gigahertz (GHz) at about 25° C. of less than about 8; alternatively, less than about 7; or then again, less than about 6;

a fracture toughness of greater than 0.3 MPa·m½; alternatively, greater than 0.5 MPa·m½; or then again, greater than about 1 MPa·m½; and a modulus of rupture (MOR) of greater than about 135 MPa; alternatively, greater than 275 MPa; or then again, greater than about 340 MPa;

Knoop hardness of at least about 400 kg/mm2; alternatively, at least about 550 kg/mm2; or then again, at least about 700 kg/mm2; or combinations and two of more of the preceding.

To that end, the colored and opaque glass-ceramics and/or ion exchanged, colored and opaque glass-ceramics can be used in a variety of electronic devices, which can configured for wireless communication, such as, notebook computers, personal digital assistants (PDAs), portable navigation device (PNDs), media players, mobile phones, portable inventory devices (PIDs), game controllers, computer "mice", computer keyboards, electronic book readers, and other devices.

The colored and opaque glass-ceramics of this disclosure may be further processed before its final intended use. One such post-processing includes, ion-exchanging of the glass-ceramic to form a glass-ceramic article wherein at least one surface of the glass-ceramic article is subject to an ion exchange process, such that the one ion exchanged ("IX") surface exhibits a compressive layer having a depth of layer (DOL) greater than or equal to 2% of the overall article thickness and exhibiting an average surface compression (CS) of in an aspect of at least about 200 megapascals (MPa) and in another aspect of at least about 300 MPa. Any ion exchange process known to those in the art can be suitable so long as the above DOL and compressive strength are achieved. In some aspects, a housing or enclosure having an overall thickness of about 2 millimeters (mm) might exhibit a compressive layer exhibiting a DOL of about 40 μm with that compressive layer exhibiting an average surface compression (CS) of at least 500 MPa. Again any ion exchange process which achieves these features is suitable.

Other aspects of embodiments and/or embodiments of this disclosure relate to ion exchangeable, colored and opaque glass-ceramics or ion exchanged colored and opaque glass-ceramics of the previous paragraph. In an aspect, ion exchangeable colored and opaque glass-ceramics are capable of being treated to have a layer under an average surface compression (CS) of at least about 200 megapascals (MPa). Such compressively stressed layer can extend a distance from a surface of the glass-ceramic into the glass-ceramic to a depth (a.k.a depth of layer and DOL) of at least about 20 microns (µm) and, optionally, such compressively stressed layer has a DOL of at least about 60 µm.

It follows that in another aspect, ion exchanged, colored and opaque glass-ceramics can have been treated to have to an average surface compression (CS) of at least about 200 MPa in a compressively stressed layer having a DOL of at least about 20 µm and, optionally, a DOL of at least about 60 µm. In aspects relating to about 0.8 millimeter (mm) thick ion exchanged, colored and opaque glass-ceramics, compressively stressed layers can have a DOL of at least about 20 µm up to about 150 µm; alternatively, a DOL of at least about 40 µm up to about 150 µm; and, then again, a DOL of at least about 80 µm up to about 120 µm.

It should be noted that in addition to single step ion-exchange processes, multiple ion exchange procedures can be utilized to create a designed IX profile for enhanced performance. That is, a stress profile created to a selected depth by using ion-exchange baths of differing concentration of ions or by using multiple baths using different ion species having different ionic radii.

As used herein, the term "ion-exchanged" is understood to mean treating the colored and opaque glass-ceramics with a heated solution containing ions having a different ionic radius than ions that are present in the glass-ceramic surface and/or bulk, thus replacing smaller ions with the larger ions or vice versa depending on the ion exchange temperature conditions. Potassium ions, for example, could either replace, or be replaced by, sodium ions in the glass, again depending upon the ion exchange temperature conditions. Alternatively, other alkali metal ions having larger atomic radii, such as rubidium or cesium could replace smaller alkali metal ions in the disclosed glass-ceramic material. Similarly, other alkali metal salts such as, but not limited to, sulfates, halides, and the like may be used in the ion exchange process.

In the instant method, it is contemplated that both types of ion exchange can take place; i.e., larger for smaller ions are replaced and smaller for larger ions are replaced. In one aspect, the method involves ion exchanging (particularly lithium-for-sodium ion exchange) the glass article by placing the glass-ceramic article in an $NaNO_3$ bath at temperatures between 310 and 430° C. for times up to 10 hours. In another aspect, the IOX can be accomplished utilizing mixed potassium/sodium baths at similar temperatures and times; e.g. an 80/20 $KNO_3/NaNO_3$ bath or alternatively a 60/40 $KNO_3/NaNO_3$ at comparable temperatures. In yet another aspect, a two-step IOX process wherein the first step is accomplished in a Li-containing salt bath; e.g. the molten salt bath can be a high temperature sulfate salt bath composed of $Li_2SO_4$ as a major ingredient, but diluted with $Na_2SO_4$, $K_2SO_4$ or $Cs_2SO_4$ in sufficient concentration to create a molten bath. This ion-exchange step functions to replace the larger sodium ions in the glass structure with the smaller lithium ions which are found in the Li-containing salt bath. The second IOX functions to exchange Na into the glass-ceramic and can be accomplished as above by a $NaNO_3$ bath at temperatures between 310° C. and 430° C.

Characterization of Colorable and Ceramable Glass(es), Colored and Opaque Glass-Ceramic(s), and/or Ion Exchanged Colored and Opaque Glass-Ceramic(s)

CIELAB color space coordinates (e.g., CIE L*; CIE a*; and CIE b*; or CIE L*, a*, and b*; or L*, a*, and b*) for describing the color of colored and opaque glass-ceramic(s) and/or ion exchanged colored and opaque glass-ceramic(s) according to aspects of embodiments and/or embodiments of this disclosure were determined by methods known to those in the art from total reflectance—specular included—measurements, such as, those described by F. W. Billmeyer, Jr., "Current American Practice in Color Measurement," Applied Optics, Vol. 8, No. 4, pp. 737-750 (April 1969), which are incorporated by reference herein, at http://www.xphotonics.com/tech/Color%20Measurement/Current%20American%20Practice %20in%20Color%20Measurement.pdf. Namely, total reflectance—specular included—measurements were made of surfaces prepared to an optical polish using sample disks measuring about 33 mmØ×8 mm thick. Equipment and supplies for making such total reflectance—specular included—measurements and translating results to obtain L*; a*; and b* color space coordinates included:

a ultraviolet-visible-near infrared (UV-VIS-NIR) spectrophotometer equipped with integrating sphere such as the commercially available Varian Cary 5G or PerkinElmer Lambda 950 UV-VIS-NIR spectrophotometers (see e.g., LAMBDA™ UV/Vis/NIR and UV/Vis spectrophotometers—950, 850, and 650; Applications and Use of Integrating Spheres; and High Performance Lambda Spectroscopy Accessories brochures, which are incorporated by reference herein, at http://www.perkinelmer.com.cn/CMSResources/Images/46-131732BRO_Lambda950850650Americas.pdf; http://www.perkinelmer.com/CMSResources/Images/44-74191APP_LAMBDA650IntegratingSpheres.pdf; and http://www.labsphere.com/uploads/LambdaSpectroscopyBrochure.pdf, respectively) appropriately equipped and configured so as to be enabled for total reflectance—specular included—measurements in the wavelength range 250-3300 nm (e.g., ultraviolet (UV: 300-400 nm), visible (Vis: 400-700 nm), and infrared (IR: 700-2500 nm); and an analytical software (UV/VIS/NIR application pack of the GRAMS spectroscopy software suite commercially available from Thermo Scientific West Palm Beach, Fla., US; see e.g., GRAMS-UG1009 brochure, which is incorporated by reference herein, at https://www.thermo.com/eThermo/CMA/PDFs/Product/productPDF_24179.pdf) for color measurements coupled to a UV-VIS-NIR spectrophotometer that translated measurement results to the CIELAB color space coordinates (L*; a*; and b*) based on F02 illuminant and a 10-degree standard observer.

Viscosity of colorable and ceramable glass(es) according to aspects of embodiments and/or embodiments of this disclosure can be by methods know to those in the art, such as, those described in ASTM C965-96 (and its progeny, all herein incorporated by reference) "Standard Practice for Measuring Viscosity of Glass Above the Softening Point;" ASTM C1351M-96 (and its progeny, all herein incorporated by reference) "Standard Test Method for Measurement of Viscosity of Glass Between 10E4 Pa·s and 10E8 Pa·s by Viscous Compression of a Solid Right Cylinder;" and ASTM C1350M-96 (and its progeny, all herein incorporated by reference) "Standard Practice for Measuring Viscosity of Glass Between Softening Point and Annealing Range (Approximately 10E8 Pa·s to Approximately 10E13 Pa·s)," ASTM International, Conshohocken, Pa., US.

The dielectric parameters (e.g., loss tangent, dielectric constant . . . etc.) the color of colored and opaque glass-ceramic(s) and/or ion exchanged colored and opaque glass-ceramic(s) according to aspects of embodiments and/or embodiments of this disclosure were characterized at room temperature by methods know to those in the art, such as, those done with a open-ended coaxial probe similar to that outlined in J. Baker-Jarvis, et al., "High-Frequency Dielectric Measurements," IEEE Instrum. Meas. Mag., pp. 24-31, April 2010; J. Baker-Jarvis et al., "Analysis of an Open-Ended Coaxial Probe," IEEE Trans. Instrum. Meas., vol. 43. no. 5, pp. 711-718 (October 1994);. J. Baker-Jarvis et al. "Transmission/Reflection and Short-Circuit Line Methods for Measuring Permittivity and Permeability," Natl. Inst. Stand. Technol. Tech. Note 1355-R, 236 pages (December 1993); and J. Baker-Jarvis et al. "Dielectric and Conductor-Loss Characterization and Measurements on Electronic Packaging Materials," Natl. Inst. Stand. Technol. Tech. Note 1520, 156 pages (July 2001), which are incorporated by reference herein, at http://whites.sdsmt.edu/classes/ee692gwmm/notes/Baker-Jarvis_IMM_2010.pdf; http://www.eee1.nist.gov/advanced_materials_publications/Baker-Jarvis%20IM%2094.pdf; http://www.eee1.nist.gov/advanced_materials_publications/Baker-Jarvis%20TN%201355-R.pdf and http://whites.sdsmt.edu/classes/ee692gwmm/additional/NIST_Tech_Note_1520.pdf, respectively. Those in the art will appreciate that in the laboratory, dielectric parameters can be measured by different methods employing various sample sizes and shapes (see, for example, J. Baker-Jarvis, et al., "High-Frequency Dielectric Measurements," IEEE Instrum. Meas. Mag., pp. 24-31, April 2010; Agilent Application Note: "Basics of Measuring the Dielectric Properties of Materials," Brochure No: 5989-2589EN, Agilent Technologies, Inc., April 28, 2005 (at http://whites.sdsmt.edu/classes/ee692gwmm/additional/Agilent Basics_dielectric_properties. pdf); H. E. Bussey, "Measurement of RF Properties of Materials. A Survey", Proc. IEEE, vol. 55, pp. 1046-1053, 1967 (at http ://ieeexplore.ieee.org/xpl/login.sp?reload=true&tp=&arnumber=1447649&url=http%3A%2F%2F); J. Baker-Jarvis et al., "Measuring the Permittivity and Permeability of Lossy Materials: Solids, Liquids, Metals, Building Materials, and Negative-index Materials", Natl. Inst. Stand. Technol. Tech. Note 1536, 2004 (at http://www.eee1.nist.gov/advanced_materials_publications/Baker-Jarvis%2OTN1536.pdf), which are incorporated by reference herein. The measurement technique depends on the frequency of interest. At frequencies up to several MHz a capacitive technique is typically employed. The material is placed in between the plates of a capacitor, and from the measurements of capacitance, the dielectric constant can be calculated. The capacitance model works well if the wavelength is much longer than the conductor separation.

Identity of Phase assemblages and/or crystalline sizes for colorable and ceramable glass(es), colored and opaque glass-ceramic(s), and/or ion exchanged colored and opaque glass-ceramic(s) according to aspects of embodiments and/or embodiments of this disclosure were determined by X-ray diffraction (XRD) analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing surfaces of colored and opaque glass-ceramic(s) and/or ion exchanged colored and opaque glass-ceramic(s) according to aspects of embodiments and/or embodiments of this disclosure were determined by analytical techniques know to those in the art, such as, electron microprobe (EMP); x-ray photoluminescence spectroscopy (XPS); secondary ion mass spectroscopy (SIMS) . . . etc.

Figure 5:
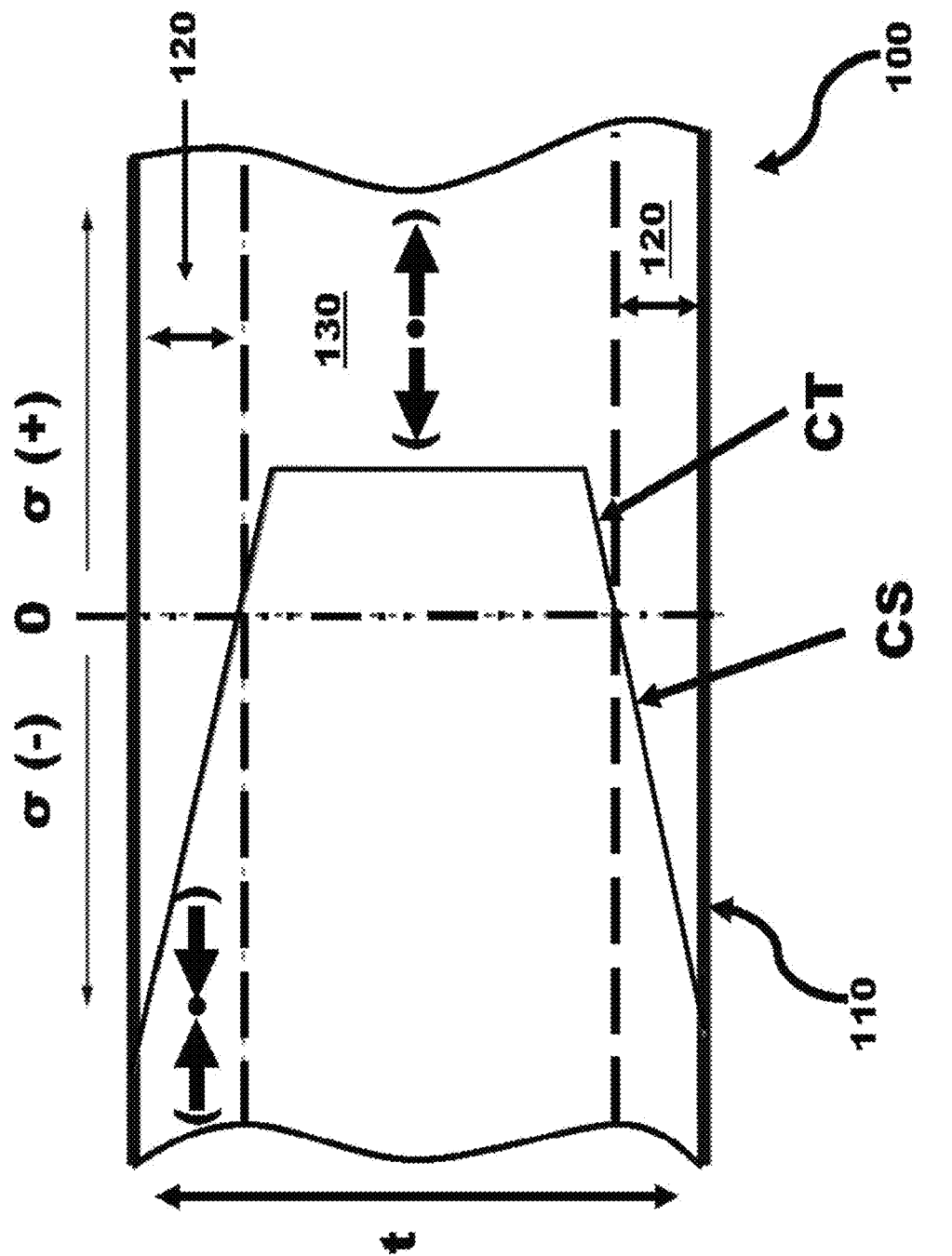
FIG. 5 shows a schematic illustration of a cross section of an ion-exchanged sample and the characterizing parameters: average surface compression (CS); average central tension (CT); sample thickness (t); and depth of layer 120 (DOL) which is the perpendicular distance from the surface of the sample to the location within the sample at which the stresses changes sign (i.e., zero) resulting from surface compression and central tension and determinable from the sodium profiles of FIG. 4.

Average surface compression (CS) and depth of layer (DOL) of ion-exchanged materials that are transparent can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan (see e.g., FSM-30 Surface Stress Meter Brochure, Cat no. FS-0013E at http://www.orihara-ss.co.jp/catalog/fsm/fsm-30-Ecat.pdf; FSM-60 Surface Stress Meter Brochure, Cat no. FS-0013E at http://www.luceo.co.jp/english/pdf/FSM-60LE%20Ecat.pdf; FSM-6000LE Surface Stress Meter Brochure, Revision 2009.04 at http://www.luceo.co.jp/english/pdf/FSM-6000LE%20Ecat.pdf; FSM-7000H Surface Stress Meter Brochure, Cat no. FS-0024 2009.08 at http://www.luceo.co.jp/catalog/catalog-pdf/FSM-7000H_cat.pdf; T. Kishii, "Surface Stress Meters Utilising the Optical Waveguide Effect of Chemically Tempered Glasses," Optics & Lasers in Engineering 4 (1983) pp. 25-38 at http://www.orihara-ss.co.jp/data/literature01/A034.pdf; and K. Kobayashi et al., "Chemical Strengthening of Glass and Industrial Application," 昭和 52 年 (1977) [52 (1977)], pp. 109-112 at http://www.orihara-ss.co.jp/data/literature01/A001.pdf, all of which are incorporated by reference herein). Because of the opacity of the colored and opaque glass-ceramic(s) and/or ion exchanged colored and opaque glass-ceramic(s) of this disclosure, the techniques for measuring CS using surface stress meters as discussed above are currently not available but could be in the future. Accordingly, CS can be obtained by selectively etching samples of an ion-exchanged glass-ceramics such that a curvature is induced in the sample. The extent of the induced curvature expressed by the etched sample relates to the stress. By successively selectively etching a sample, measuring induced curvatures, and determining the corresponding stresses, a stress profile for the sample can be developed. DOL can also be obtained in this way (see e.g., V. M. Sglavo et al., "Procedure for Residual Stress Profile Determination by Curvature Measurements," Mechanics of Materials, 37 (2005) pp. 887-898 available at http://www.sciencedirect.com/, which is incorporated by reference herein). Simultaneously, the chemical compositions of the sample after each successive etching can be measured to develop concentrations profiles to yield the relationship between chemical composition and stress in the sample. Since stress relaxation in the highly crystalline materials is minimal as compared to glassy materials, a simple proportionality constant can link the concentrations profiles and stress profile. Once having determined CS using the iterated-etch/curvature method for a sample of an ion exchanged colored and opaque glass-ceramic of a specified starting composition and geometry (e.g., thickness . . . etc.) subjected to a specified ion exchange treatment, one can measure concentrations profiles (i.e., composition as a function of depth) in samples of a corresponding ion exchanged colored and opaque glass-ceramic to obtain estimates CS and DOL. To that end, average surface compression (CS) in a sample surface, average central tension (CT) in the center of a sample as a result of balancing tension stresses, and depth of layer (DOL) of ion exchanged colored and opaque glass-ceramic(s) according to aspects of embodiments and/or embodiments of this disclosure can be estimated from concentration profiles of the replacing ions and/or the replaced ions using analytical techniques know to those in the art, such as, EMP, XPS, SIMS . . . etc. During an ion-exchange processes as discussed above, ions having a smaller ionic radius present in the glass-ceramic surface and/or bulk can be exchanged with ions having a larger ionic radius. As schematically illustrated in FIG. 5, when this results in compressive stress in the surface 110 of a sample 100, balancing tensile stresses are induced in a central region 130 of the sample 100 to balance the forces throughout the sample 100. The average surface compression (CS) is related to the average central tension (CT) by the following relationship:

$$CS = CT \times (t-2DOL)/DOL;$$

where t is the thickness of the colored and opaque glass-ceramic sample 100 and DOL (depth of layer 120) is the distance from the surface 110 of the sample 100 along a normal to the surface 110 to the location at which the stresses within the sample 100 change sign (i.e., zero).

For a sample 100, the integrated central tension (ICT) is given by the integral of stress throughout the tensile portion of the stress profile (i.e., central region 130 of the sample 100). ICT is related to the full thickness (t) of the sample 100, the depth of layer (DOL) 120 of the compressive stress layer, the average central tension (CT), and the shape or profile of the compressive stress layer by the following relationship: ICT=CT×(t−2DOL), where the thickness (t−2DOL) of the central region 130 is a direction perpendicular to the surface. To balance forces within the sample 100, the integrated surface compression (ICS) has the same magnitude as the ICT, but has an opposite (minus) sign, since the overall integrated stress of the sample must be zero: −ICS+ICT=0. ICS is related to the depth of layer (DOL) 120 of the compressive stress layer, the average surface compression (CS), and the shape or profile of the compressive stress layer by the following relationship: ICS=CS×DOL, where the depth of layer (DOL) of the compressive stress region has be defined above (i.e., the distance from the surface 110 of the sample 100 along a normal to the surface 110 to the location at which the stresses within the sample 100 change sign (i.e., zero)). Making the appropriate substitutions and solving for average surface compression (CS) yields the above relationship. Using standard descriptions of diffusion and stress, a model as a function various process conditions (e.g., temperature, time, replacing ions, replaced ions . . . etc.) can and has been developed. A mutual diffusivity (i.e., effective diffusivity or interdiffusion coefficient related to motion of both replacing ions and replaced ions in opposite directions) is fitted to their measured concentration profiles from known process conditions. These mutual diffusivity follows an Arrhenius relationship that has an exponential dependence on the reciprocal temperature (the logarithm of the mutual diffusivity is proportional to 1/T), as is known those in the art. The boundary conditions for the diffusion calculation are based on the ion-exchange bath composition and the starting composition of the sample. For a given diffusivity, sample geometry (e.g., plate), sample or plate thickness, and ion-exchange bath composition (e.g., salt bath composition), solution of the resulting one-dimensional diffusion equation proceeds along the lines given, for example, in "The Mathematics of Diffusion," 2nd ed., 1975, by J. Crank. The stress is then proportional to the concentration of the replacing ions or replaced ions in the sample after the ion-exchange processing steps are completed, as described, for example in, "Fundamentals of Inorganic Glasses," 2nd ed., 2006, by A. K. Varshneya. In order to obey force equilibrium, it might be necessary to subtract a constant so that the resulting stress curve integrates to zero. Although at higher temperatures the effects of stress relaxation might become important in the glasses, it does not appear to be so in glass-ceramics. Knowledge of the concentrations profiles using analytical techniques know to those in the art, such as, EMP, XPS, SIMS . . . etc., in conjunction with an estimate of CS as from the iterated-etch/curvature method described above yields a correlation between the two measurements. Recognizing that the iterated-etch/curvature method for determining CS is labor-intensive and destructive to the ion exchanged colored and opaque glass-ceramic, this correlation can be used to estimate CS by measurement of the concentration profiles of the ion exchanged colored and opaque glass-ceramic. This has been tested by comparing predicted concentration profiles with measured concentration profiles, and comparison with average surface compression (CS) determined through measurements of compressive stress and depth-of-layer (DOL), when available.

Vickers indentation cracking threshold measurements performed to identify the threshold at which cracks initiate in a surface of colorable and ceramable glass(es), colored and opaque glass-ceramic(s), and/or ion exchanged colored and opaque glass-ceramic(s) according to aspects of embodiments and/or embodiments of this disclosure is known in the art and described, for example, in pages 130-134 of "Materials Science and Engineering (fourth edition)" by William D. Callister (John Wiley & Sons, New York, 1997), which are incorporated by reference herein. Unless otherwise specified, the Vickers indentation cracking threshold measurements described herein are performed by applying and then removing an indentation load using a Vickers indenter (a=68.00°) to a glass surface at 0.2 mm/min. The indentation maximum load is held for 10 seconds. The indentation cracking threshold is defined as the indentation load at which greater than 50% of 10 indents exhibit any number of radial/median cracks emanating from the corners of the indent impression. The maximum load is increased until such threshold is met for a given glass composition. Vickers indentation cracking threshold measurements are performed at room temperature in 50% relative humidity.

Flexural Strength of colorable and ceramable glass(es), colored and opaque glass-ceramic(s), and/or ion exchanged colored and opaque glass-ceramic(s) according to aspects of embodiments and/or embodiments of this disclosure can be characterized by methods know to those in the art, such as, those described in ASTM C1499 (and its progeny, all herein incorporated by reference) "Determination of Monotonic Equibiaxial Flexural Strength Advanced Ceramics," ASTM International, Conshohocken, Pa., US.

Young's Modulus, Shear Modulus, and Poisson's Ratio colorable and ceramable glass(es), colored and opaque glass-ceramic(s), and/or ion exchanged colored and opaque glass-ceramic(s) according to aspects of embodiments and/or embodiments of this disclosure can be characterized by methods know to those in the art, such as, those described in ASTM C1259 (and its progeny, all herein incorporated by reference) "Standard Test Method for Dynamic Young's Modulus, Shear Modulus, and Poisson's Ratio for Advanced Ceramics by Impulse Excitation of Vibration," ASTM International, Conshohocken, Pa., US.

Knoop hardness of colorable and ceramable glass(es), colored and opaque glass-ceramic(s), and/or ion exchanged colored and opaque glass-ceramic(s) according to aspects of embodiments and/or embodiments of this disclosure can be characterized by methods know to those in the art, such as, those described in ASTM C1326 (and its progeny, all herein incorporated by reference) "Standard Test Methods for Vickers Indentation Hardness of Advanced Ceramics," ASTM International, Conshohocken, Pa., US.

Vickers hardness of colorable and ceramable glass(es), colored and opaque glass-ceramic(s), and/or ion exchanged colored and opaque glass-ceramic(s) according to aspects of embodiments and/or embodiments of this disclosure can be characterized by methods know to those in the art, such as, those described in ASTM C1327 (and its progeny, all herein incorporated by reference) Standard Test Methods for Vickers Indentation Hardness of Advanced Ceramics," ASTM International, Conshohocken, Pa., US.

EXAMPLES

The following examples illustrate the advantages and features of this disclosure and in are no way intended to limit this disclosure thereto:

Inasmuch as the sum of the individual constituents totals or very closely approximates 100, for all practical purposes the reported values may be deemed to represent weight percent (wt %). The actual precursor glass batch ingredients may comprise any materials, either oxides, or other compounds, which, when melted together with the other batch components, will be converted into the desired oxide in the proper proportions.

Examples 1-40

The exemplary precursor glasses (most of which are colorable and ceramable glass compositions) listed in Table 1-A were prepared by introducing about 2200 g of appropriately batched raw materials to a platinum crucible to yield upon melting 2000 g total. The crucible was then placed in a furnace having a temperature anywhere form about room temperature at about 1400° C. The following melting cycle was used:

120 min to 1600° C.; and 300 min at 1600° C.

TABLE I-A

Figure 4:
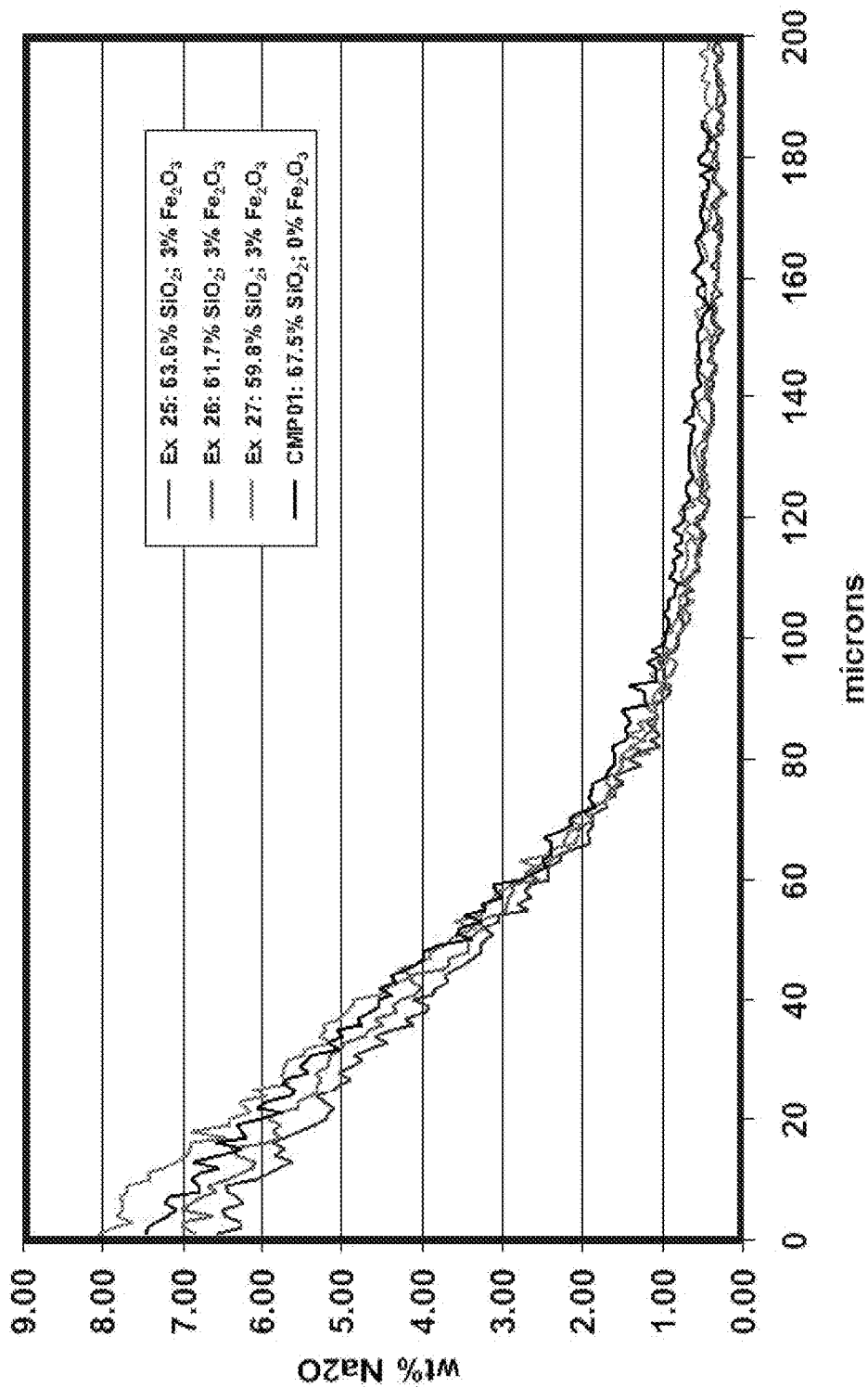
FIG. 4 shows the sodium profiles measured by electron microprobe for black and opaque glass-ceramics made according to still other aspects of embodiments and/or embodiments of this disclosure and an analogous white and opaque glass-ceramic after ion-exchange in NaNO$_3$ molten salt bath at 430° C. wherein each sample was heat treated at 780° C.-2 h and 1000° C.-4 at 5° C./min. As similar Na$_2$O chemical profiles are obtained for black and opaque glass-ceramics made according to other aspects of embodiments and/or embodiments of this disclosure and analogous white and opaque glass-ceramic similar strength improvement are expected.
Figure 6:
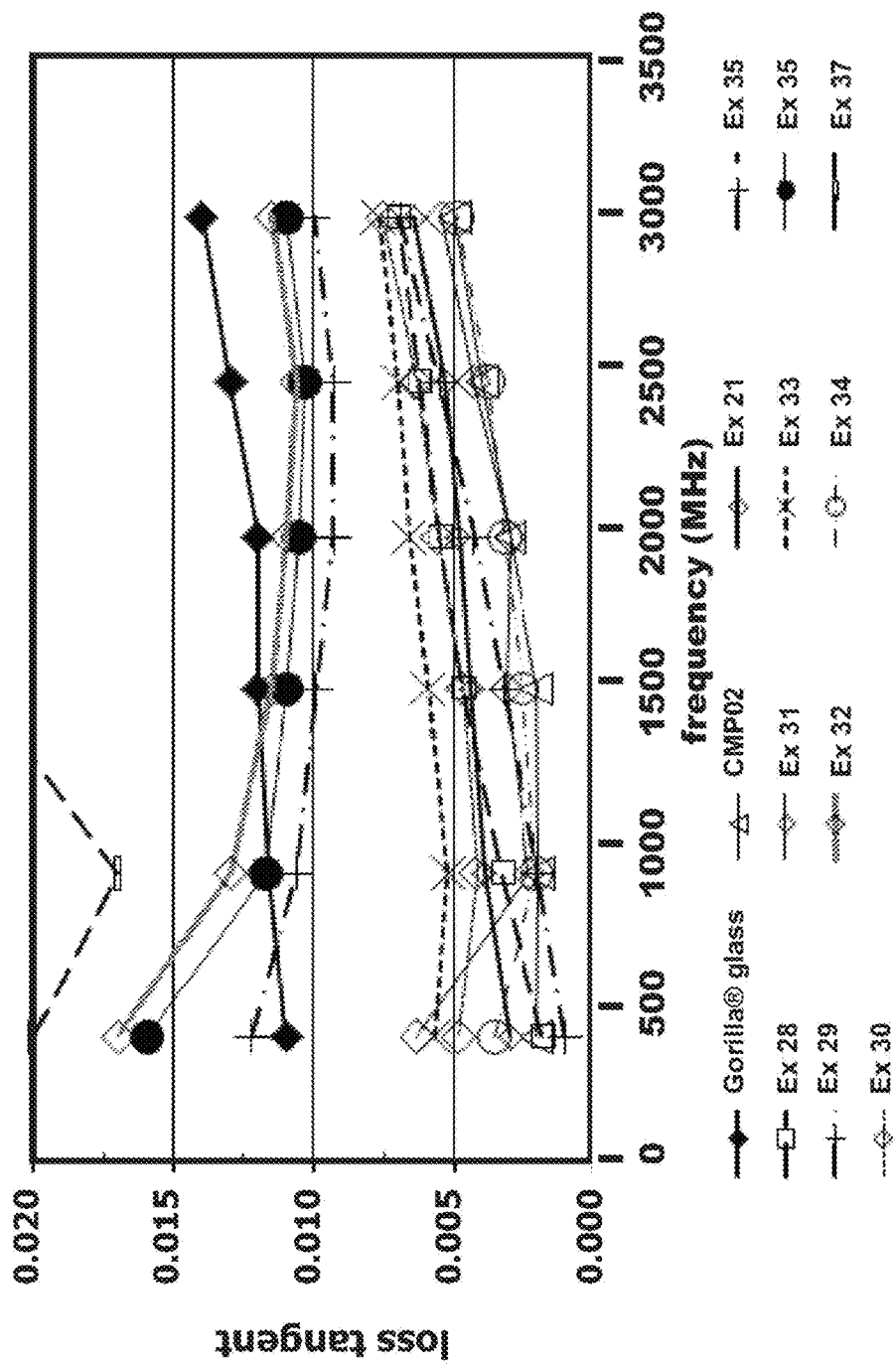
FIG. 6 shows the loss tangent as a function of frequency for several colored and opaque glass-ceramics made according to aspects of embodiments and/or embodiments of this disclosure compared with commercially available GORILLA® glass 2317 and an analogous white and opaque (uncolored) glass-ceramic.

| Example No. | Glass Base Composition Wt % | | | | | | | | | | Total Wt % |
|---|---|---|---|---|---|---|---|---|---|---|---|
| | $SiO_2$ | $Al_2O_3$ | $B_2O_3$ | $Li_2O$ | $Na_2O$ | $TiO_2$ | MgO | ZnO | $P_2O5$ | $SnO_2$ | |
| 1 | 61.7 | 23.9 | 0 | 4.2 | 0.3 | 2.5 | 2 | 1.5 | 0 | 0.3 | 96.6 |
| 2 | 63 | 22.8 | 0 | 4.5 | 0.3 | 5.1 | 1.8 | 0 | 0 | 0 | 97.5 |
| 3 | 61.6 | 22.3 | 0 | 3.9 | 0.3 | 5 | 1.8 | 1.4 | 0 | 0.3 | 96.6 |
| 4 | 53.5 | 24.5 | 0 | 3.6 | 0.3 | 4.7 | 1.1 | 1.4 | 7.7 | 0 | 96.8 |
| 5 | 64 | 20.8 | 0 | 3.7 | 0.3 | 5 | 1.8 | 1.2 | 0 | 0.3 | 97 |
| 6 | 64.2 | 21.1 | 0 | 3.7 | 0.32 | 4.9 | 1.7 | 1.2 | 0 | 0.3 | 97.5 |
| 7 | 65.6 | 20 | 0 | 3.5 | 0.3 | 4.7 | 1.7 | 1.5 | 0 | 0.3 | 97.5 |
| 8 | 65.3 | 20 | 0.5 | 3.5 | 0.3 | 4.6 | 1.7 | 1.3 | 0 | 0.3 | 97.5 |
| 9 | 63.8 | 19.6 | 1.9 | 3.3 | 0.5 | 4.2 | 1.8 | 2.2 | 0 | 0.3 | 97.6 |
| 10 | 65.6 | 16.9 | 0 | 3.5 | 0.3 | 5.3 | 1.7 | 1.5 | 0 | 0.3 | 95.1 |
| 11 | 67.1 | 20.5 | 0 | 3.6 | 0.3 | 4.8 | 1.7 | 1.5 | 0 | 0.3 | 99.7 |
| 12 | 62.8 | 22.8 | 0 | 4 | 0.3 | 5.1 | 2.6 | 0.0 | 0 | 0.3 | 97.8 |
| 13 | 65.2 | 19.9 | 0 | 3.5 | 0.3 | 4.7 | 1.7 | 1.5 | 0 | 0.3 | 97 |
| 14 | 63.8 | 20.7 | 0 | 3.7 | 0.3 | 4.9 | 1.8 | 1.2 | 0 | 0.3 | 96.7 |
| 15 | 64 | 20.8 | 0 | 3.7 | 0.3 | 6.2 | 1.8 | 0 | 0 | 0.3 | 97 |
| 16 | 64.1 | 20.1 | 0 | 3.7 | 0.3 | 5 | 1.8 | 1.2 | 0 | 0.3 | 96.6 |
| 16 | " | " | " | " | " | " | " | " | " | " | 96.6 |
| 17 | 65.3 | 21.2 | 0 | 3.8 | 0.3 | 3.6 | 1.8 | 1.3 | 0 | 0.3 | 97.6 |
| 18 | 65.9 | 21.4 | 0 | 3.8 | 0.3 | 2.6 | 1.8 | 1.3 | 0 | 0 | 97.1 |
| 19 | 63.9 | 20.1 | 0 | 3.7 | 0.3 | 5 | 1.8 | 1.2 | 0 | 0.3 | 96.3 |
| 20 | 63.9 | 20.1 | 0 | 3.7 | 0.3 | 5 | 1.8 | 1.2 | 0 | 0.3 | 96.3 |
| 21 | 65.4 | 20.1 | 2 | 3.4 | 0.5 | 4.3 | 2.5 | 2.2 | 0 | 0.3 | 98 |
| 22 | 67.2 | 20.6 | 0 | 3.6 | 0.3 | 4.8 | 1.7 | 1.5 | 0 | 0.3 | 99 |
| 23 | 64 | 20.1 | 0 | 3.6 | 0.3 | 5 | 1.7 | 1.2 | 0 | 0.2 | 96.1 |
| 24 | 64.2 | 20.8 | 0 | 3.7 | 0.3 | 5 | 1.8 | 1.2 | 0 | 0.2 | 97.2 |
| FIG. 4 | | | | | | | | | | | |
| CMP01 | 67.5 | 20.6 | 0 | 3.6 | 0.3 | 4.8 | 1.7 | 1.2 | 0 | 0.3 | 100 |
| 25 | 63.6 | 21.3 | 0 | 3.7 | 0.3 | 4.8 | 1.7 | 1.3 | 0 | 0.3 | 97 |
| 26 | 61.7 | 22.5 | 0 | 4 | 0.3 | 5 | 1.8 | 1.4 | 0 | 0.3 | 97 |
| 27 | 59.8 | 23.8 | 0 | 4.2 | 0.4 | 5.2 | 1.9 | 1.4 | 0 | 0.3 | 97 |
| FIG. 6 | | | | | | | | | | | |
| CMP02 | 65.4 | 20.1 | 2 | 3.6 | 0.4 | 4.4 | 1.8 | 2.2 | 0 | 0.3 | 100 |
| 28 | 63.6 | 19.6 | 2 | 3.5 | 0.4 | 4.3 | 1.8 | 2.2 | 0 | 0.3 | 97.5 |
| 29 | 64.2 | 19.6 | 0 | 3.4 | 0.3 | 4.6 | 1.6 | 1.4 | 0 | 0.3 | 95.4 |
| 30 | 63.6 | 20.6 | 0 | 3.7 | 0.3 | 4.9 | 1.7 | 1.2 | 0 | 0.3 | 96.5 |
| 31 | 66 | 20.1 | 0 | 3.5 | 0.3 | 4.7 | 1.7 | 1.5 | 0 | 0.3 | 98.2 |
| 32 | 64.6 | 19.7 | 0 | 3.5 | 0.3 | 4.6 | 1.6 | 1.5 | 0 | 0.3 | 96.0 |
| 21 | 65.4 | 20.1 | 2 | 3.4 | 0.5 | 4.3 | 2.5 | 2.2 | 0 | 0.3 | 98 |
| 33 | 65.6 | 20 | 0 | 3.5 | 0.3 | 4.7 | 1.7 | 1.5 | 0 | 0.3 | 97.5 |
| 34 | 64 | 20.8 | 0 | 3.7 | 0.3 | 5 | 1.8 | 1.2 | 0 | 0.3 | 97 |
| 35 | 64.4 | 19.9 | 2 | 3.6 | 0.4 | 4.4 | 1.8 | 2.2 | 0 | 0.3 | 98.8 |
| 36 | 64.8 | 19.8 | 0 | 3.5 | 0.3 | 4.7 | 1.6 | 1.5 | 0 | 0.3 | 96.4 |
| 37 | 63.8 | 20.7 | 0 | 3.7 | 0.3 | 4.9 | 1.8 | 1.2 | 0 | 0.3 | 96.7 |

TABLE I-A-continued

Figure 7:
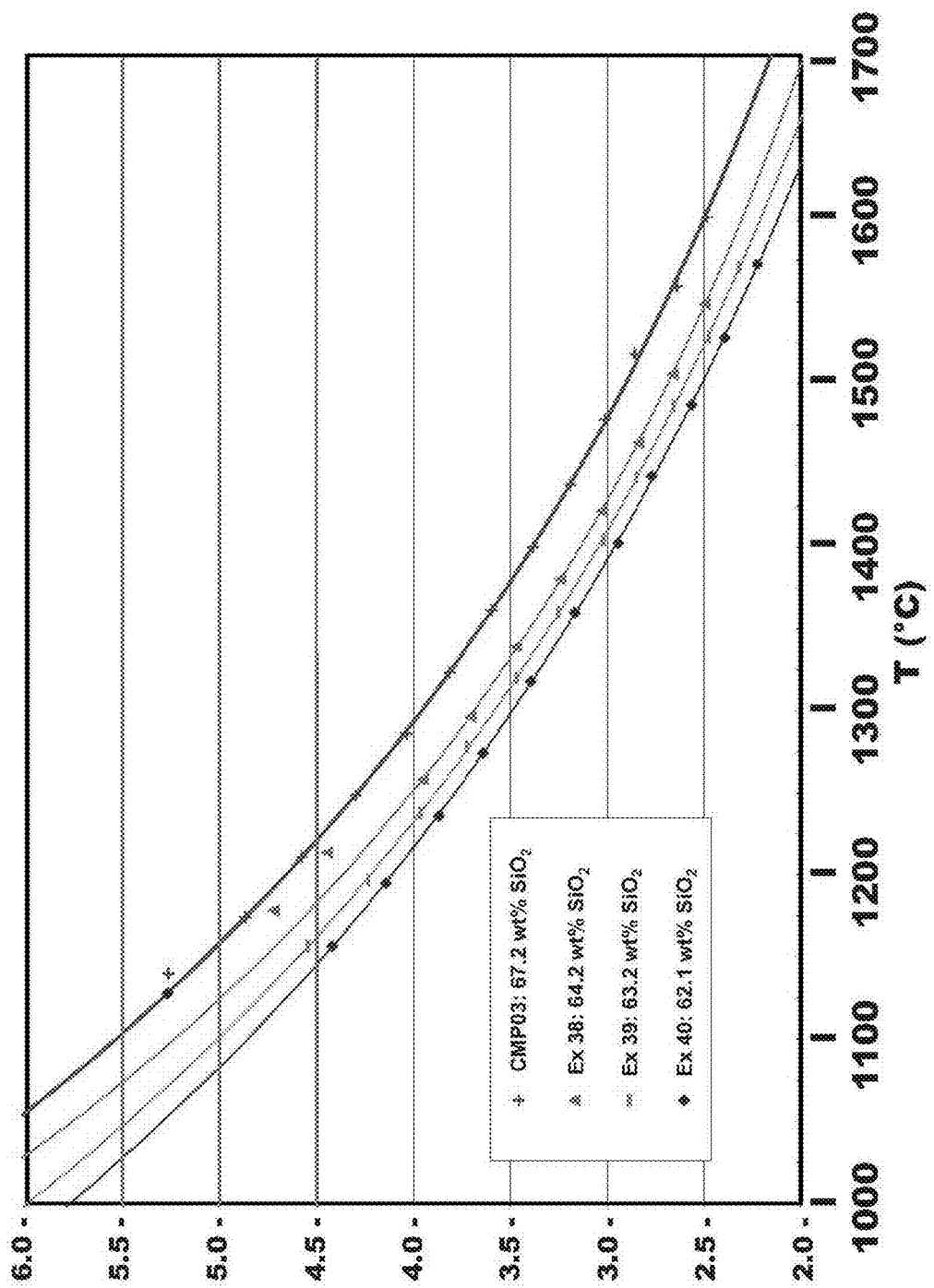
FIG. 7 shows the viscosity as a function of temperature for colorable and ceramable glasses made according to aspects of embodiments and/or embodiments of this disclosure and an analogous ceramable glass demonstrating that decreasing the SiO$_2$ amount decreases the viscosity thereby making the colorable and ceramable glasses of this disclosure easier to melt and form.

| | | | | FIG. 7 | | | | | | | |
|---|---|---|---|---|---|---|---|---|---|---|---|
| CMP03 | 67.2 | 20.6 | 0 | 3.6 | 0.3 | 4.8 | 1.7 | 1.5 | 0 | 0.3 | 100 |
| 38 | 64.2 | 20.5 | 0 | 3.6 | 0.3 | 4.8 | 1.7 | 1.5 | 0 | 0.0 | 96.9 |
| 39 | 63.2 | 21.1 | 0 | 3.7 | 0.3 | 4.9 | 1.8 | 1.5 | 0 | 0.3 | 96.8 |
| 40 | 62.1 | 21.7 | 0 | 3.8 | 0.3 | 5.1 | 1.8 | 1.6 | 0 | 0.3 | 96.7 |

| | Colorants Composition Wt % | | | | | | | | |
|---|---|---|---|---|---|---|---|---|---|
| Example No. | $Fe_2O_3$ | $V_2O_5$ | $Co_3O_4$ | NiO | $MnO_2$ | $Cr_2O_3$ | CuO | S | Total Wt % |
| 1 | 3.4 | 0 | 0 | 0 | 0 | 0 | 0 | 0 | 3.4 |
| 2 | 2.5 | 0 | 0 | 0 | 0 | 0 | 0 | 0 | 2.5 |
| 3 | 3.4 | 0 | 0 | 0 | 0 | 0 | 0 | 0 | 3.4 |
| 4 | 3 | 0 | 0 | 0 | 0 | 0 | 0 | 0 | 3 |
| 5 | 0.6 | 0 | 0 | 0 | 2.4 | 0 | 0 | 0 | 3 |
| 6 | 1.9 | 0 | 0 | 0 | 0.7 | 0 | 0 | 0 | 2.5 |
| 7 | 2.5 | 0 | 0 | 0 | 0 | 0 | 0 | 0 | 2.5 |
| 8 | 2.5 | 0 | 0 | 0 | 0 | 0 | 0 | 0 | 2.5 |
| 9 | 2.5 | 0 | 0 | 0 | 0 | 0 | 0 | 0 | 2.5 |
| 10 | 4.9 | 0 | 0 | 0 | 0 | 0 | 0 | 0 | 4.9 |
| 11 | 0.3 | 0 | 0 | 0 | 0 | 0 | 0 | 0 | 0.3 |
| 12 | 2.5 | 0 | 0 | 0 | 0 | 0 | 0 | 0 | 2.5 |
| 13 | 2.5 | 0 | 0 | 0.6 | 0 | 0 | 0 | 0 | 3.1 |
| 14 | 2.4 | 0 | 0.7 | 0.1 | 0 | 0 | 0 | 0 | 3.3 |
| 15 | 2.4 | 0 | 0.6 | 0 | 0 | 0 | 0 | 0 | 3 |
| 16 | 2.5 | 0 | 0 | 0 | 0 | 0.3 | 0 | 0 | 2.8 |
| 16 | " | " | " | " | " | " | " | 0 | 2.8 |
| 17 | 2.5 | 0 | 0 | 0.5 | 0 | 0 | 0 | 0 | 2.5 |
| 18 | 2.5 | 0 | 0 | 0 | 0 | 0 | 0.5 | 0 | 2.5 |
| 19 | 2.5 | 0 | 0 | 0.5 | 0 | 0 | 0 | 0 | 3 |
| 20 | 2.5 | 0 | 0 | 0 | 0 | 0 | 0.5 | 0 | 3 |
| 21 | 0 | 2 | 0 | 0 | 0 | 0 | 0 | 0.9 | 2 |
| 22 | 0 | 1 | 0 | 0 | 0 | 0 | 0 | 0.6 | 1 |
| 23 | 0.6 | 0 | 0 | 0 | 3.4 | 0 | 0 | 0 | 4 |
| 24 | 0.4 | 0 | 0 | 0 | 2.5 | 0 | 0 | 0 | 2.9 |
| | | | | FIG. 4 | | | | | |
| CMP01 | 0 | 0 | 0 | 0 | 0 | 0 | 0 | 0 | 0 |
| 25 | 3 | 0 | 0 | 0 | 0 | 0 | 0 | 0 | 3 |
| 26 | 3 | 0 | 0 | 0 | 0 | 0 | 0 | 0 | 3 |
| 27 | 3 | 0 | 0 | 0 | 0 | 0 | 0 | 0 | 3 |
| | | | | FIG. 6 | | | | | |
| CMP02 | 0 | 0 | 0 | 0 | 0 | 0 | 0 | 0 | 0 |
| 28 | 2.5 | 0 | 0 | 0 | 0 | 0 | 0 | 0 | 2.5 |
| 29 | 3.7 | 0 | 0.9 | 0 | 0 | 0 | 0 | 0 | 4.6 |
| 30 | 1.9 | 0 | 0 | 0 | 1.7 | 0 | 0 | 0 | 3.5 |
| 31 | 1.9 | 0 | 0 | 0 | 0 | 0 | 0 | 0 | 1.8 |
| 32 | 3.7 | 0 | 0 | 0.3 | 0 | 0 | 0 | 0 | 4 |
| 21 | 0 | 2 | 0 | 0 | 0 | 0 | 0 | 0.9 | 2 |
| 33 | 2.5 | 0 | 0 | 0 | 0 | 0 | 0 | 0 | 2.5 |
| 34 | 0.6 | 0 | 0 | 0 | 2.4 | 0 | 0 | 0 | 3 |
| 35 | 1.2 | 0 | 0 | 0 | 0 | 0 | 0 | 0 | 1.2 |
| 36 | 3.6 | 0 | 0 | 0 | 0 | 0 | 0 | 0 | 3.6 |
| 37 | 1.3 | 0 | 0 | 0 | 2 | 0 | 0 | 0 | 3.3 |
| | | | | FIG. 7 | | | | | |
| CMP03 | 0 | 0 | 0 | 0 | 0 | 0 | 0 | 0 | 0 |
| 38 | 3.1 | 0 | 0 | 0 | 0 | 0 | 0 | 0 | 3.1 |
| 39 | 3.2 | 0 | 0 | 0 | 0 | 0 | 0 | 0 | 3.2 |
| 40 | 3.3 | 0 | 0 | 0 | 0 | 0 | 0 | 0 | 3.3 |

TABLE I-B

| | Heat treatment Heating Rate 5° C./min | | | | CIE L*A*B* (F02) | | | Phases Identified by X-Ray Diffraction | |
|---|---|---|---|---|---|---|---|---|---|
| Example No. | TEMPn (° C.) | TIMEn (hrs) | TEMPc (° C.) | TIMEc (hrs) | CIE L* | CIE a* | CIE b* | XRD major phase ID[a] | XRD minor phase ID[a] |
| 1 | 780 | 2 | 1000 | 2 | 28.15 | −0.49 | −1.97 | ND | ND |
| 2 | 780 | 2 | 950 | 4 | 27.69 | 0.31 | −2.08 | ND | ND |
| 3 | 780 | 2 | 950 | 4 | 25 | 0 | −0.98 | BS | SP, BQ, PB |
| 4 | 780 | 2 | 950 | 4 | ND | ND | ND | BS | SP, PB, RU, MZP |
| 5 | 780 | 2 | 900 | 4 | 27.77 | −0.14 | −1.77 | BS | RU, SP, PB |

TABLE I-B-continued

| | Heat treatment Heating Rate 5° C./min | | | | CIE L*A*B* (F02) | | | Phases Identified by X-Ray Diffraction | |
|---|---|---|---|---|---|---|---|---|---|
| Example No. | TEMPn (° C.) | TIMEn (hrs) | TEMPc (° C.) | TIMEc (hrs) | CIE L* | CIE a* | CIE b* | XRD major phase ID$^a$ | XRD minor phase ID$^a$ |
| 6  | 780 | 2 | 900  | 4 | 26.87 | −0.03 | −1.35 | BQ, BS | SP, PB |
| 7  | 780 | 2 | 1000 | 4 | 28.66 | −0.4  | −3.18 | BS     | BQ, SP, PB |
| 8  | 780 | 2 | 975  | 4 | 40.5  | −1.1  | −5.12 | BS     | PB, SP, RU |
| 9  | 780 | 2 | 975  | 4 | 44.36 | −0.74 | 0.56  | BS     | PB, SP, RU |
| 10 | NA  | NA| NA   | NA| ND    | ND    | ND    | ND     | ND |
| 11 | 780 | 2 | 1000 | 4 | ND    | ND    | ND    | BS     | RU, SP |
| 12 | 780 | 2 | 950  | 4 | 26.37 | −0.34 | −1.9  | BS, BQ | PB |
| 13 | 780 | 2 | 1000 | 4 | 28.74 | −0.54 | −3.05 | BS     | RU, SP, PB |
| 14 | 780 | 2 | 975  | 4 | ND    | ND    | ND    | BS     | PB, RU |
| 15 | 780 | 2 | 1000 | 4 | ND    | ND    | ND    | BS     | SP, PB, RU, BQ |
| 16 | 780 | 2 | 1000 | 1 | 35    | −1.25 | −2.67 | BS     | PB, SP, RU |
| 16 | 780 | 2 | 1000 | 2 | 39    | −0.67 | −3.32 | BS     | PB, SP, RU |
| 17 | 780 | 2 | 1000 | 2 | 27.9  | −0.37 | −2.4  | BS     | PB, SP, RU |
| 18 | 780 | 2 | 1000 | 2 | 28    | −0.27 | −2.41 | BS     | PB, SP, RU |
| 19 | 780 | 2 | 1000 | 2 | 28    | −0.3  | −2.6  | BS     | PB, SP, RU |
| 20 | 780 | 2 | 1000 | 2 | 28    | −0.27 | −2.41 | BS     | PB, SP, RU |
| 21 | 780 | 2 | 950  | 4 | 26.8  | 0.2   | −1.12 | BS     | SP, RU |
| 22 | 780 | 2 | 950  | 4 | 32.2  | 0.9   | −6.28 | BS     | SP, RU |
| 23 | 780 | 2 | 875  | 4 | ND    | ND    | ND    | BS     | SP, IMT |
| 24 | 780 | 2 | 875  | 4 | ND    | ND    | ND    | BS     | SP, RU, BQ, IMT |
| | | | FIG. 4 | | | | | | |
| CMP01 | 780 | 2 | 1000 | 4 | ND | ND | ND | ND | ND |
| 25 | 780 | 2 | 1000 | 4 | ND | ND | ND | ND | ND |
| 26 | 780 | 2 | 1000 | 4 | ND | ND | ND | ND | ND |
| 27 | 780 | 2 | 1000 | 4 | ND | ND | ND | ND | ND |
| | | | FIG. 6 | | | | | | |
| CMP02 | 780 | 2 | 1000 | 4 | ND | ND | ND | ND | ND |
| 28 | 780 | 2 | 1000 | 4 | ND | ND | ND | ND | ND |
| 29 | 780 | 2 | 1000 | 2 | ND | ND | ND | ND | ND |
| 30 | 780 | 2 | 950  | 4 | ND | ND | ND | ND | ND |
| 31 | 780 | 2 | 1000 | 4 | ND | ND | ND | ND | ND |
| 32 | 780 | 2 | 1000 | 4 | ND | ND | ND | ND | ND |
| 21 | 780 | 2 | 950  | 4 | 26.8 | 0.2 | −1.12 | BS | SP, RU |
| 33 | 780 | 2 | 1000 | 4 | ND | ND | ND | ND | ND |
| 34 | 780 | 2 | 950  | 4 | ND | ND | ND | ND | ND |
| 35 | 780 | 2 | 1000 | 4 | ND | ND | ND | ND | ND |
| 36 | 780 | 2 | 1000 | 4 | ND | ND | ND | ND | ND |
| 37 | 780 | 2 | 950  | 4 | ND | ND | ND | ND | ND |
| | | | FIG. 7 | | | | | | |
| CMP03 | NA | NA | NA | NA | NA | NA | NA | NA | NA |
| 38 | NA | NA | NA | NA | NA | NA | NA | NA | NA |
| 39 | NA | NA | NA | NA | NA | NA | NA | NA | NA |
| 40 | NA | NA | NA | NA | NA | NA | NA | NA | NA |

BS = beta-spodumene ss,
BQ = beta-quartz ss,
SP = spinel ss (hercynite + gahnite),
PB = pseudobrookite,
RU = rutile,
MZP = magnesium zinc phosphate,
IMT = iron manganese titanate,
NA = not applicable,
ND = not determined Each glass was then poured onto a steel sheet, formed into one or more patties of glass, and annealed for 1 hour at 600° C. The viscosities as a function of temperature for several of colorable and ceramable glass samples (i.e., Examples 37, 39, and 40 of Table 1A and 1B) as well as a comparative sample (i.e., CMP03 of Table 1A and 1B) was determined and is shown in FIG. 7 which demonstrates that decreasing the SiO$_2$ amount decreases the viscosity thereby making the colorable and ceramable glasses compatible commercial melting and/or forming technologies. Patties or portions of patties of colorable and ceramable glass compositions were then heat treated in a static furnace according to the ceramming cycle listed in Table I-B:

Introduced into a furnace at room temperature (RT) or up to 500° C.;
5° C./min to TEMPn;
Hold at TEMPn for TIMEn;
Heating from TEMPn to TEMPc at 5° C./min;
Hold at TEMPc for TIMEc; and
Cool from TEMPc to about room temperature at 5° C./min, after which time each is removed, subjected to analysis, and/or further processing.

Figure 2:
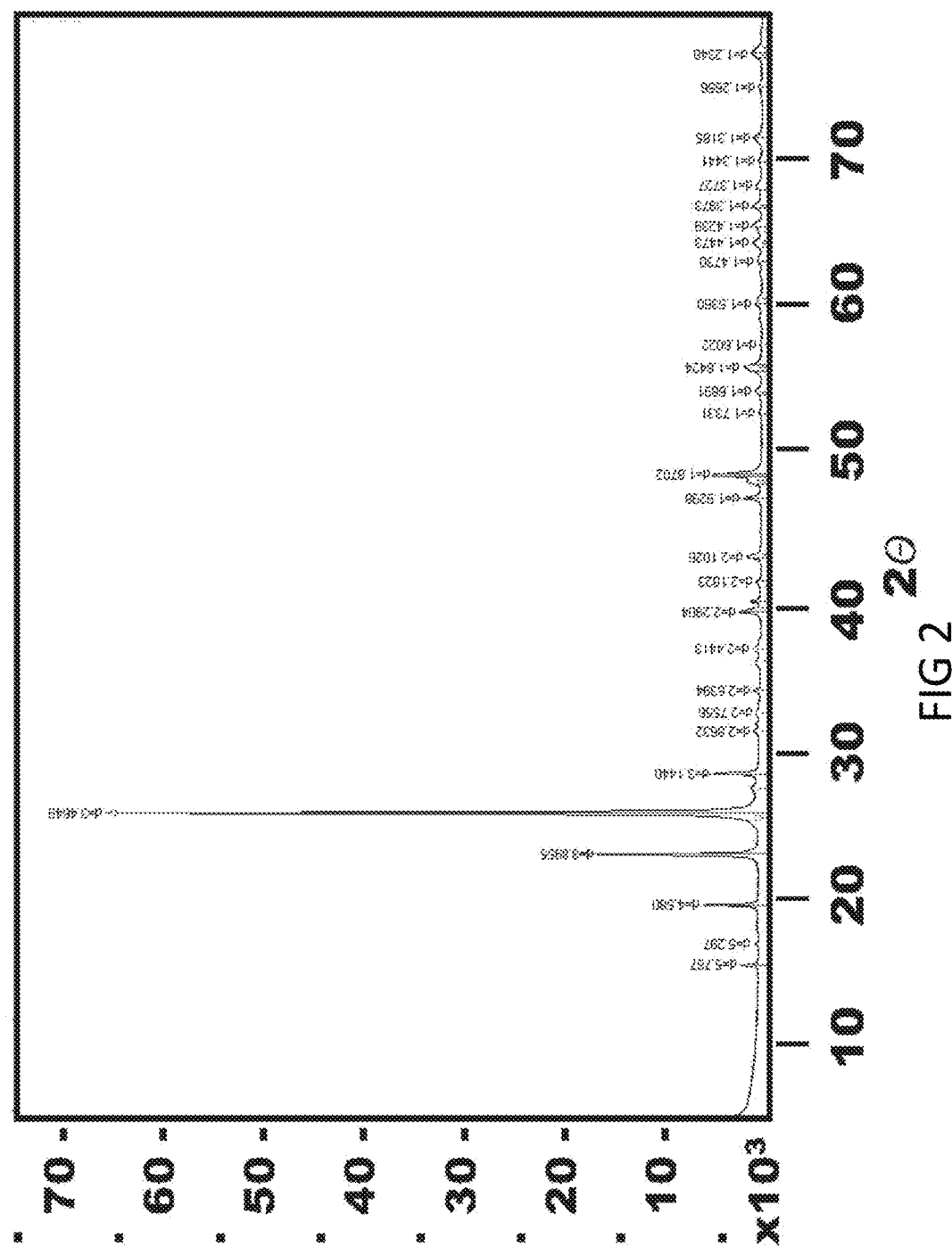
FIG. 2 shows the XRD pattern obtained for a colored and opaque glass-ceramic (Example 5 listed in Table 1 using a heat treatment of 780° C. -2 h and 900° C.-4h, heated at a ramp rate of 5° C. /min) made according to other aspects of embodiments and/or embodiments of this disclosure.
Figure 3:
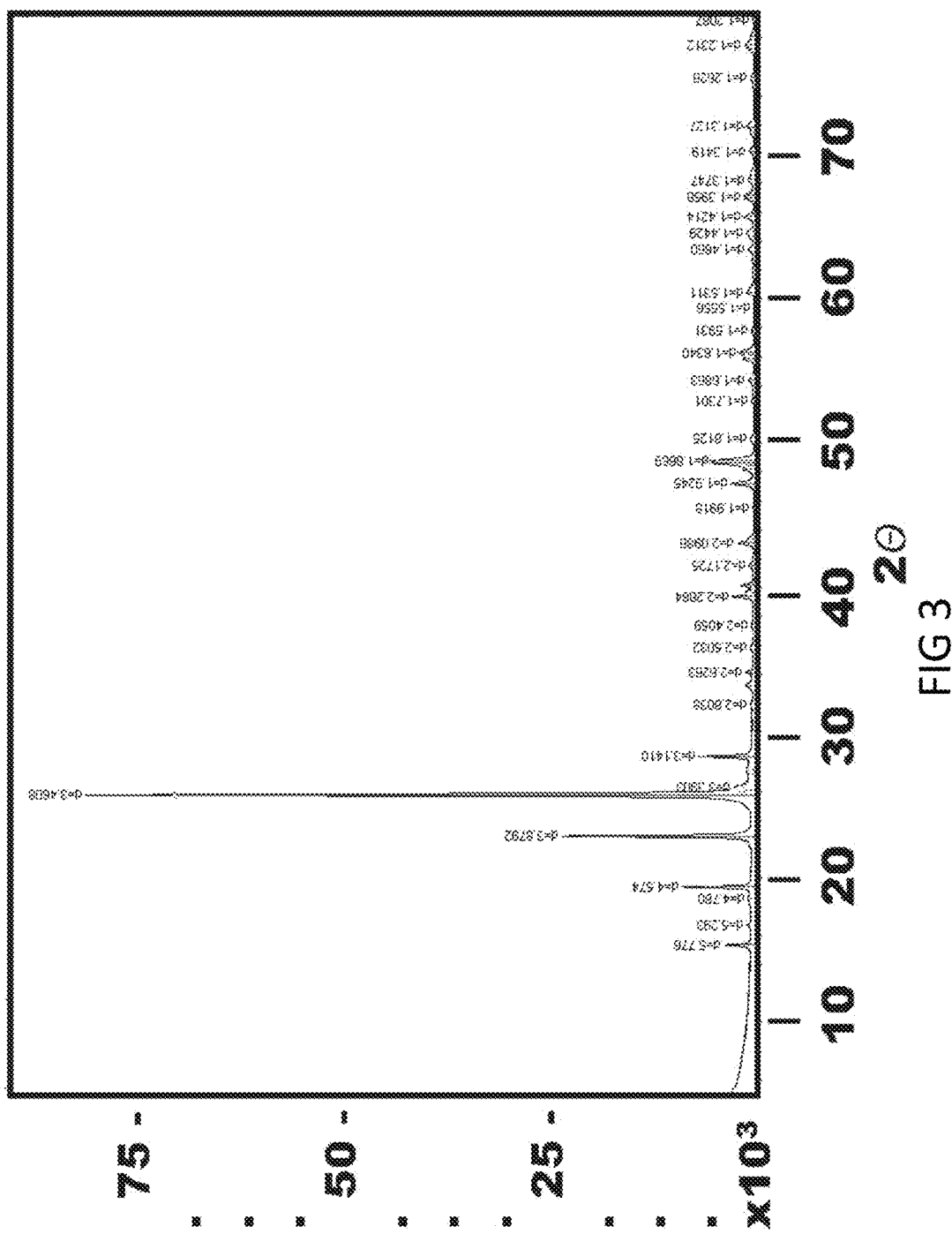
FIG. 3 shows the XRD diffraction pattern obtained for a colored and opaque glass-ceramic (Example 13 listed in Tables 1A and 1B using a heat treatment of 780° C.-2 h and 1000° C.-4 h, heated at a ramp rate of 5° C./min) made according to still other aspects of embodiments and/or embodiments of this disclosure.

Among the analysis was the CIELAB color space coordinates (e.g., CIE L*; CIE a*; and CIE b*; or CIE L*, a*, and b*; or L*, a*, and b*) determination and phase identification by x-ray diffraction summarized in Table 1B (e.g., Examples 1-24). FIGS. 1-3 show the x-ray diffraction patterns for Examples 3, 5, and 13 of Table 1A and 1B. Dielectric parameters (e.g., loss tangent, dielectric constant . . . etc.) were determined with the loss tangent as a function of frequency for several colored and opaque glass-ceramics (i.e., Examples 21 and 28-37 of Table 1A and 1B) as shown FIG. 6 and when compared with commercially available GORILLA® glass 2317 and an analogous white and opaque (uncolored) glass-ceramic (i.e., CMP02 of Table 1A and 1B), are surprisingly compatible therewith.

Among the further processing was an ion exchange treatment. A glass-ceramic material is cut into shapes suitable for ion exchange evaluation. For the purposes of this ion exchange treatment, glass-ceramic materials were cut into appropriately sized samples. Each sample is ground to appropriate dimensions and then given an optical polish on all surfaces. The samples are then cleaned to eliminate any residual organic contamination. Each cleaned sample is suspended in a bath of molten $NaNO_3$ and held at 430° C. so as to minimize points of contact between the glass-ceramic and the holder or bath vessel. Other alkali salts, such as nitrates and halides of K, Rb, and Cs, might also be used. After appropriate number of hours in the bath (e.g., about eight hours), the sample is removed, allowed to cool, and washed in deionized water to remove any residual salt. Following an ion exchange treatment (i.e., $NaNO_3$ at 430° C.), several samples (i.e., Examples 25, 26, and 27 of Table 1A and 1B) as well as a comparative sample (i.e., CMP01 of Table 1A and 1B) were analyzed using an electron microprobe to obtain sodium profiles as shown in FIG. 4 which in turn could be used to determine characterizing parameters average surface compression (CS) and depth of layer (DOL) schematically illustrated in FIG. 5 and discussed above.

Accordingly, various modifications, adaptations, and alternatives may occur to one skilled in the art without departing from the spirit and scope of this disclosure. It should be understood that all such modifications and improvements have been deleted herein for the sake of conciseness and readability but are properly within the scope of the following claims.

We claim:
1. A method of making a glass-ceramic, comprising:
    a. melting preselected amounts of ingredients having preselected compositions meltable to a colorable and ceramable glass, wherein the preselected compositions of the ingredients comprise Ti and a colorant comprising from 0.3 to 5 wt % of one or more compounds of iron comprising one or more $Fe^{2+}$ sources, one or more $Fe^{3+}$ sources, or one or more $Fe^{2+}$ sources and one or more $Fe^{3+}$ sources;
    b. subjecting the colorable and ceramable glass to a nucleating heat treatment by heating at a preselected first rate to a preselected nucleating temperature (TEMPn), and holding at the preselected nucleating temperature (TEMPn) for a preselected first time; and
    c. subjecting the heat treated glass to a ceramming heat treatment by heating at a preselected second rate to a preselected ceramming temperature (TEMPc), holding at the preselected ceramming temperature (TEMPc), for a preselected second time; and cooling at a preselected third rate to a preselected end temperature (TEMPe) to produce the glass-ceramic, wherein the glass-ceramic comprises:
        crystalline phases comprising β-spodumene solid solution and crystalline phases comprising pseudobrookite; and
        an opaque material having coordinates in the CIELAB color space, determined from specular reflectance measurements using a spectrophotometer with specular reflectance, in the following ranges:
        L* =from about 20 to about 45;
        a* =from about -2 to about +2; and
        b* =from about -12 to about +1.

2. A method of making a glass-ceramic according to claim 1, wherein the preselected nucleating temperature (TEMPn) comprises about 700° C. to about 850° C. and the preselected first time comprises about ¼ hour to about 4 hours.

3. A method of making a glass-ceramic according to claim 1, wherein the preselected ceramming temperature (TEMPc) comprises about 850° C. to about 1150° C. and the preselected second time comprises about ¼ hour to about 16 hours.

4. A method of making a glass-ceramic according to claim 1, wherein prior to the nucleating heat treatment further comprising shaping the colorable and ceramable glass into an article.

5. A method of making a glass-ceramic according to claim 4, wherein the article comprises a shape usable as a component of a portable computing device.

6. A method of making a glass-ceramic according to claim 1, wherein the colorant further comprises from 0 to 4 wt % of one or more compounds of one or more additional transition metals, wherein the one or more additional transition metals is selected from the group consisting of Co, Ni, Mn, Cr, Cu, and combinations thereof.

7. A method of making a glass-ceramic according to claim 1, wherein the colorant further comprises one or more compounds of one or more multivalent metals and one or more compounds including one or more components capable of reducing a valence or valences of at least a portion of the one or more multivalent metals, wherein:
    1. the one or more multivalent metals is selected from the group consisting of Bi, V, Sn, and combinations thereof; and
    2. the one or more compounds including one or more components capable of reducing a valence or valences of at least a portion of the one or more multivalent metals is selected from the group consisting of C, S, and combinations thereof.

8. A method of making a glass-ceramic, comprising:
    a. melting preselected amounts of ingredients having preselected compositions meltable to a colorable and ceramable glass, wherein the preselected compositions of the ingredients comprise Ti and a colorant comprising from 0.3 to 5 wt % of one or more compounds of iron and from 0 to 4 wt % of one or more compounds of one or more additional transition metals, wherein the one or more additional transition metals is selected from the group consisting of Co, Ni, Mn, Cr, Cu, and combinations thereof;
    b. subjecting the colorable and ceramable glass to a nucleating heat treatment by heating at a preselected first rate to a preselected nucleating temperature (TEMPn), and holding at the preselected nucleating temperature (TEMPn) for a preselected first time; and
    c. subjecting the heat treated glass to a ceramming heat treatment by heating at a preselected second rate to a preselected ceramming temperature (TEMPc), holding at the preselected ceramming temperature (TEMPc), for a preselected second time; and cooling at a preselected third rate to a preselected end temperature (TEMPe) to produce the glass-ceramic, wherein the glass-ceramic comprises:

crystalline phases comprising β-spodumene solid solution and crystalline phases comprising pseudobrookite; and an opaque material having coordinates in the CIELAB color space, determined from specular reflectance measurements using a spectrophotometer with specular reflectance, in the following ranges:
$L^*$ =from about 20 to about 45;
$a^*$ =from about -2 to about +2; and
$b^*$ =from about -12 to about +1.

9. A method of making a glass-ceramic according to claim 8, wherein the colorant further comprises one or more compounds of one or more multivalent metals and one or more compounds including one or more components capable of reducing a valence or valences of at least a portion of the one or more multivalent metals, wherein:
1. the one or more multivalent metals is selected from the group consisting of Bi, V, Sn, and combinations thereof; and
2. the one or more compounds including one or more components capable of reducing a valence or valences of at least a portion of the one or more multivalent metals is selected from the group consisting of C, S, and combinations thereof.

10. A method of making a glass-ceramic according to claim 8, wherein the preselected nucleating temperature (TEMPn) comprises about 700° C. to about 850° C. and the preselected first time comprises about ¼ hour to about 4 hours.

11. A method of making a glass-ceramic according to claim 8, wherein the preselected ceramming temperature (TEMPc) comprises about 850° C. to about 1150° C. and the preselected second time comprises about ¼ hour to about 16 hours.

12. A method of making a glass-ceramic according to claim 8, wherein prior to the nucleating heat treatment further comprising shaping the colorable and ceramable glass into an article.

13. A method of making a glass-ceramic according to claim 12, wherein the article comprises a shape usable as a component of a portable computing device.

* * * * *

UNITED STATES PATENT AND TRADEMARK OFFICE
CERTIFICATE OF CORRECTION

PATENT NO. : 10,487,008 B2
APPLICATION NO. : 15/702010
DATED : November 26, 2019
INVENTOR(S) : George Halsey Beall et al.

It is certified that error appears in the above-identified patent and that said Letters Patent is hereby corrected as shown below:

On the Title Page

On page 2, in Column 1, item (56), Other Publications, Line 5, delete "C1269" and insert -- C1259 --, therefor.

On page 2, in Column 2, item (56), Other Publications, Line 2, delete "No." and insert -- No: --, therefor.

On page 2, in Column 2, item (56), Other Publications, Line 21, delete "lnstrum." and insert -- Instrum. --, therefor.

On page 2, in Column 2, item (56), Other Publications, Line 41, delete "Managaing" and insert -- Managing --, therefor.

Signed and Sealed this
Eighteenth Day of February, 2020

Andrei Iancu
*Director of the United States Patent and Trademark Office*